United States Patent [19]
Bailey et al.

[11] Patent Number: 5,553,287
[45] Date of Patent: Sep. 3, 1996

[54] METHODS AND APPARATUS FOR DYNAMICALLY USING FLOATING MASTER INTERLOCK

[75] Inventors: Christopher J. Bailey, Bearsville; Lynn M. Dirks, Boiceville; William R. Firm, Kingston; Lawraine J. Vallee, Saugerties, all of N.Y.

[73] Assignee: International Business Machines Corporation, Armonk, N.Y.

[21] Appl. No.: 261,316

[22] Filed: Jun. 16, 1994

Related U.S. Application Data

[60] Continuation of Ser. No. 963,163, Oct. 19, 1992, abandoned, which is a division of Ser. No. 444,190, Nov. 28, 1989, abandoned.

[51] Int. Cl.$^6$ .............................. G06F 9/46; G06F 13/00
[52] U.S. Cl. .................. 395/650; 364/281.3; 364/281.5; 364/281.7; 364/246.8; 364/969.2; 364/DIG. 1
[58] Field of Search ...................... 364/DIG. 1, DIG. 2

[56] References Cited

U.S. PATENT DOCUMENTS

| | | | |
|---|---|---|---|
| 3,528,062 | 9/1970 | Lehman et al. | 364/200 |
| 3,573,736 | 4/1971 | Schlaeppi | 364/200 |
| 4,104,718 | 8/1978 | Poublan et al. | 364/200 |
| 4,123,795 | 10/1978 | Dean, Jr. et al. | 395/650 |
| 4,249,241 | 2/1981 | Aberle et al. | 395/500 |
| 4,399,504 | 8/1983 | Obermack et al. | 395/650 |
| 4,488,217 | 12/1984 | Binder et al. | 395/375 |
| 4,663,709 | 5/1987 | Fujiwara et al. | 395/725 |
| 4,870,704 | 9/1989 | Matelan et al. | 395/800 |
| 5,012,409 | 4/1991 | Fletcher et al. | 395/650 |
| 5,175,852 | 12/1992 | Johnson et al. | 395/600 |

OTHER PUBLICATIONS

Joseph et al, A Multiprocessor Operating System, 1984, pp. 324-375.
Calingaert et al, Operating System Elements, 1982, pp. 189-194.

Primary Examiner—Kevin A. Kriess
Assistant Examiner—Lucien Toplu
Attorney, Agent, or Firm—Floyd A. Gonzalez

[57] ABSTRACT

A computer system, including at least one host (processor and operating system), a channel subsystem and at least one switch (together with an associated switch controller) for switchably connecting an I/O device (together with an associated I/O device control unit) to a host via said channel subsystem, in combination with means for dynamically managing I/O connectivity in said computer from each host. The I/O manager's functions are centralized at the host level across the computer system. Each host is responsible for an instance of the manager. According to the preferred embodiment of the invention the computer system, I/O manager combination includes: (a) first means, located within each switch, for providing direct host access to the switch controller associated with a given switch; (b) second means, included in each host level instance of the manager, for automatically and dynamically determining the current I/O configuration and connectivity of each host; (c) third means, included in each host level instance of the manager, for performing System Integrated Switching (i.e., switching where any instance of the I/O manager can veto a proposed configuration change) and (d) fourth means, included in each host level instance of the manager, for insuring the integrity of the I/O connectivity database, through the use of an interlock mechanism, in a multiuser environment where each user can enter multiple part commands and processes concurrently.

10 Claims, 17 Drawing Sheets

| FIG.6A |
| FIG.6B |

```
———SYS1-CONTROL-STATEMENTS—                                    ———SYS2-CONTROL-STATEMENTS—
CHPID PATH=((01),(02)),TYPE=S,                                 CHPID PATH=((03),(04)),TYPE=S,
      SWITCH=00                                                      SWITCH=09
CHPID PATH=((03),(04)),TYPE=S,                                 CHPID PATH=((05),(06)),TYPE=S,
      SWITCH=01                                                      SWITCH=0A
CNTLUNIT CUNUMBR=220,PATH=(01,02)                              CNTLUNIT CUNUMBR=310,PATH=(03,04)
         UNIT=...,LINK=(CA,CB)                                          UNIT=...,LINK=(CA,CB)
CNTLUNIT CUNUMBR=330,PATH=(03,04),                             CNTLUNIT CUNUMBR=320,PATH=(05,06)
         UNIT=...,LINK=(C7,C8)                                          UNIT=...,LINK=(C7,C8)
CNTLUNIT CUNUMBR=440,UNIT=...,                                 CNTLUNIT CUNUMBR=440,UNIT=...,
         PATH=(01,02,03,04),                                            PATH=(03,04,05,06),
         LINK=(CC,CC,CB,CB)                                             LINK=(CC,CC,CB,CB)
CNTLUNIT CUNUMBR=490,UNIT=...,                                 CNTLUNIT CUNUMBR=510,UNIT=...,
         PATH=(01,02,03,04),                                            PATH=(03,04,05,06),
         LINK=(CD,CD,CD,CD)                                             LINK=(CD,CD,CD,CD)
CNTLUNIT CUNUMBR=1F0,PATH=(01,02)                              CNTLUNIT CUNUMBR=1F0,PATH=(03,04)
         UNIT=...,LINK=(FE,FE)                                          UNIT=...,LINK=(FE,FE)
CNTLUNIT CUNUMBR=1F8,PATH=(03,04)                              CNTLUNIT CUNUMBR=2F0,PATH=(05,06)
         UNIT=...,LINK=(FE,FE)                                          UNIT=...,LINK=(FE,FE)
```

FIG.6B

METHODS AND APPARATUS FOR DYNAMICALLY USING FLOATING MASTER INTERLOCK

CROSS REFERENCE TO RELATED APPLICATION

This application is a continuation of application Ser. No. 07/963,163, filed Oct. 19, 1992, now abandoned, which is a divisional of copending application(s) Ser. No. 07/444,190 filed on Nov. 28, 1989, now abandoned.

BACKGROUND OF THE INVENTION

1. Field of the Invention

The invention relates generally to managing I/O in data processing systems. More particularly, the invention relates to dynamically managing I/O connectivity from the host processor level in a mainframe computer system.

2. Description of the Related Art

Prior-art systems for communicating between one or more host operating systems, running on all or part of a central processing complex (CPC), and a set of peripheral devices via a channel subsystem (CSS) are well known. The term "device", as used herein, is meant to include such components, whether directly addressable or not, as control units, peripheral cache memories, communications apparatus, data storage units such as direct access storage devices (DASD), tape recorders and the like.

The aforementioned systems typically use one or more control units (CUs) to control data transfer on the paths between a given CPC and a particular peripheral device. Various I/O management schemes have been developed for use in these systems to deal with I/O subsystem maintenance and reconfiguration. Users can enter maintenance and reconfiguration requests at a device CU console. This type of management scheme is referred to hereinafter as a control unit-based I/O management scheme.

An example of a data processing system that utilizes control unit-based I/O management techniques is described in copending Patent application Ser. No. 251,969, filed Sep. 26, 1988, assigned to the same assignee as the present invention. Patent application Ser. No. 251,969 is hereby incorporated by reference.

Methods and apparatus are described in the referenced application for automatically reconfiguring a data processing system during operation such that devices can be removed from the system during maintenance with the system automatically reconfiguring itself to continue operations.

According to the teachings in the referenced application, a manually presented definition of the various paths between each CPC and each device is entered into the host system and channel subsystem when the data processing system is initialized. Configuration tables, maintained at both the host and channel subsystem level, contain data defining and identifying the channels, switches (if used), CUs and various devices. The relationship of these elements, contained in these tables, effectively define all the I/O paths between each CPC and each peripheral device.

Sometime after initialization a registration process takes place wherein each host sends information to each device CU informing the CU that it (the CPC) is a device user. It should be noted, for later reference and comparison with the present invention, that the device CU in the referenced application is not cognizant of any other devices coupled to a particular CPC.

After the registration process is complete and before any device is taken off line, the CPCs to be affected need to be notified, by the particular device CU(s) involved, of pending configuration changes. In effect, the referenced application uses a "bottom up" (from a system hierarchy point of view) notification scheme for CUs to notify CPCs of quiesce requests via the paths between a device and any affected channels.

It should be also noted that the quiescing scheme taught in the referenced application is host driven, i.e., a device CU waits for registration information from the CPCs to which it is ultimately attached. If the registration information is never supplied, e.g., if the device starts offline and will change to online (or fails), the CU does not know of any attachment to the host. Such a failure would prevent the scheme taught in the referenced application from working properly since the computer I/O configuration must be identified to the hardware and software that will use it.

Often, the identification of a system's I/O configuration is complex. That is, the definition of it is difficult and requires a lot of advanced planning. The difficulty in definition is largely due to the complexity of I/O in large installations where there are multiple processors and applications that need to concurrently share or potentially access I/O resources. In defining the I/O configuration many factors must be taken into account. Logical constraints, such as which I/O units must be accessed, the speed of the I/O units, the overhead of shared I/O protocols and interlocks, and the number of logical sessions an I/O unit can support are examples of such factors. Also, physical system constraints must be considered, such as distance from the processor, accessibility (by cables or maintenance personnel), and weight distribution of the I/O units on the floor.

Since correctly defining the I/O configuration takes such effort, other products that require an I/O definition compound that complexity. There may be only one, primary, I/O definition. That definition must be altered when either the physical configuration, or the logical requirements on the I/O are changed. If there are other, secondary, I/O definitions for use by other products which must be updated in coordination with the primary, then the task of altering the I/O definition requires more effort, is far more prone to error, and requires more planning for a coordinated execution of the change.

Accordingly, it would be desirable to be able to query the channel subsystem from the host level of a data processing system, to dynamically determine the entire I/O connectivity attached to a processor. Such information would enable the host to create a host view (top-down view) of all paths from the host to an attached set of devices. In addition to providing a centralized view of the particular CUs attached to a given processor, a map of neighboring devices under the influence of the given processor would automatically be at hand. Such information would be useful for other I/O management tasks, such as dynamically managing connectivity, analyzing data traffic, scheduling jobs for I/O recovery, etc.

Furthermore, the ability to dynamically create an I/O connectivity database (i.e., to create a current correct system I/O configuration without additional user intervention) at the host level would eliminate the problems that would occur in a host driven registration system if a particular CU should fail to be informed of its attachment to the host. The host could automatically create the latest I/O map in real time.

As data processing needs of system users grow, the number of peripheral devices connected to and supported by data processing systems also grows. Multiple data processing applications requiring a plurality of various peripheral devices increase systemwide connectivity requirements. As a result the number of connections (and ultimately paths) to be identified, remembered and managed increases. The ability of each CU to store and process all the required data to notify multiple host processors possibly affected by configuration changes, etc., is more limited in terms of resources than the ability of each host processor to deal with I/O management.

Accordingly, it would also be desirable if instead of a device control unit-based I/O management scheme, a centralized host-based I/O management scheme could be devised to dynamically manage connectivity from any host. This would eliminate having to enter I/O management requests at the CU level particularly when the devices become numerous and widely distributed. Furthermore, a centralized host-based management scheme would eliminate the need to coordinate operator action at a system console with actions of maintenance personnel at the control units or devices.

Adding still further to the complexity of managing I/O in present day computer systems is the use of switches in the data paths between the channel subsystem and peripheral devices. The use of switches further increase device connectivity capability and flexibility by increasing the number of logical available connections while at the same time reducing the number of physical connections required. However, with this increased capability and flexibility the task of I/O management increases as the number of devices that can be connected to a CPC goes up and the number of CPCs that can be connected to a device increases.

Furthermore, space and other physical plant limitations often dictate that the peripheral devices be located further and further away from the host computing resources, making a centralized I/O management scheme even more important. Whereas prior art data processing systems needed to keep peripherals within a range of approximately 400 feet from the CPC on account of constraints related to the length of connecting electrical cables; the use of state of the art fiber optic data links has extended the range of where peripherals can be located to over a mile from the CPC.

All of the factors stated hereinabove make it even more desirable, if not essential, to be able to initiate and control I/O connectivity from a central point, preferably at the host level in the data processing system.

Given the need and desirability of performing centralized dynamic I/O connectivity management, new problems need to be addressed before the centralized management function can be performed with integrity.

In a computer I/O configuration where connectivity options are increased using switches (or even nested layers of switches), switchable I/O resources may be inadvertently removed from physical connectivity with a system or program which requires them. Such a loss of I/O resources may cause the program or system to lose its data and/or functional integrity, causing it to fail.

There are no known switching products that integrate physical switching operations with the systems' logical view of the I/O connectivity. Due to larger I/O configurations with more shared devices, more complex systems, and more-automated operations environments, the manual effort required by existing switching systems to be coordinated with systems operations is more intensive and less effective. Current switching systems do not provide the ability to protect systems from accidental outages. There is a need for switching systems to provide for greater integration of switching functions within the systems where they operate in order to reduce error-prone, manual and/or redundant efforts.

System Integrated Switching, as the term is used hereinafter, is a means by which logical availability changes can be made in order to reflect physical connectivity changes. A path is logically available as long as the operating system, the subsystem that controls I/O, or other program indicates that when performing I/O requests to a device, the specific path to the device may be used for that I/O. A path is physically connected as long as there are means to perform the I/O operation.

It would be desirable if logical availability changes were made in such a way that a system could preclude the physical change when that system would be adversely affected by the physical change. Roughly, a component of the system (e.g., any host processor in a multiprocessor environment) can state, "No, don't make this change, it will remove something I need." With System Integrated Switching, a computer system complex would have the ability to maintain its data and/or functional integrity by prohibiting physical changes to its required I/O paths.

In addition, such a system could make use of resources as soon as they are physically connected without additional operator effort since physical I/O connectivity is automatically reflected in the system's view of logical availability.

A centrally operated I/O connectivity management system that includes both a System Integrated Switching capability and the ability to dynamically create an I/O connectivity database is presently unknown.

In order to implement such a system, it is necessary to be able to provide direct host access to switches (and their associated switch controllers, which is the hardware component that controls the state of the switch) that, according to the prior art, are "transparent" (as defined hereinafter) to normal system operation.

Dynamic switches are defined herein as switches which operate by making connections when they are needed, and which break connections when they are no longer needed. Connect and disconnect delimiters are utilized to operate such switches in a manner that is transparent to programming. Techniques for operating switches in this manner are described in a copending Patent Application, entitled "SWITCH AND ITS PROTOCOL FOR MAKING DYNAMIC CONNECTIONS", (IBM docket number PO9-88-011), filed Oct. 30, 1989, in the name of P. J. Brown, et al, hereby incorporated by reference.

In commercially available computer systems, host processors (and if more than one operating system on a processor, each operating system) can "see" switches as they "see" other devices (e.g., disks, etc.), however the hosts are not cognizant of switches as switches, nor are the hosts cognizant of which switches lie in any given path to another device. Hence the switches are "transparent" to a host.

In known systems, a host can communicate with a switch controller on a separate link not going through the switch. It is also known that a host can communicate with a switch controller indirectly via the switch and a control unit located outside the switch. This lack of direct access to the switch controller (via the switch itself) limits the host's ability to control and manage the switch as an I/O path component. This is particularly true in a multiprocessor environment where coherency needs to be maintained across the system when, for example, a switch (or several of its ports) is taken out of service.

In order to implement a centralized dynamic I/O connectivity management system, it is necessary for the host processors to be cognizant of the switches as switches, to know the paths in which the switches lie, and to have the aforementioned direct access to switch controllers.

Means for identifying the existence of switches coupled to a channel, means for identifying the address of where channels are attached to switches, means for querying the channel subsystem to collect switch existence and address information, are used in this application, and described in detail hereinbelow.

It would be desirable to be able to provide for the aforesaid direct host access capability, in combination with the various means to make hosts cognizant of switches as switches, etc., to be able to effect the type of centralized control, management and coherency required to implement a dynamic I/O connectivity manager. Such a combination would facilitate remote control of switch functions, would enable the recording of switch error status at the host level, facilitate switch recovery, identify resources in an I/O configuration, and provide a means for interprocessor communications via each switch control unit/device that is coupled to more than one processor. Accordingly, it would be desirable to be able to provide the aforementioned switch access feature in a centrally operated I/O connectivity management system.

Finally, a user of a distributed application (i.e., an application that has peers running on separate computers, e.g., the dynamic I/O connectivity management system contemplated herein) needs to be assured that a command or set of commands are performed to completion before another user can issue a command or set of commands.

The application needs to let only one user access the application at any single point in time, and reject all other users until the first user has completed its task (of one or more commands). Rather than a manual, procedural method to communicate between multiple users to keep their efforts synchronized, it would be desirable if the application could assume the overhead and responsibility of assuring that the state of the application environment is controlled by only one user at a time. This feature (referred to hereinafter as a Floating Master Interlock) would enable centralized dynamic I/O connectivity management systems to run concurrently on a plurality of host processors and insure the integrity of critical data, for example, data stored at each of the aforementioned dynamic switch control units, etc.

SUMMARY OF THE INVENTION

Accordingly, it is an object of the invention to perform centralized (host-based) dynamic I/O connectivity management.

It is a further object of the invention to be able to automatically query a computer system's channel subsystem so each host can dynamically determine the entire I/O configuration attached thereto and determine connectivity.

It is still a further object of the invention to provide a computer system in which physical switching operations are integrated with the system's logical view of I/O connectivity, i.e., provide a computer system capable of performing System Integrated Switching.

Further yet, it is an object of the invention to provide direct host access to switches (and their associated switch controllers) that are transparent to normal computer system operation so that each instance of the novel connectivity manager can determine the existence of other instances of the manager operating on other hosts via a switch-based registration protocol.

Further objects of the invention are to perform dynamic I/O connectivity management in a multiuser environment in a manner which assures that a command or set of commands are performed to completion by one user (an instance of the novel I/O manager) before another user can issue a command or set of commands, and to assume the overhead and responsibility for this function at the host level of the computer system.

The invention comprises the combination of (a) a computer system, including at least one host (processor and operating system), a channel subsystem and at least one switch (together with an associated switch controller) for switchably connecting an I/O device (together with an associated I/O device control unit) to a host via said channel subsystem; with (b) novel means for dynamically managing I/O connectivity in said computer from each host.

According to the preferred embodiment of the invention, each host is responsible for an instance of the dynamic I/O connectivity manager. In other words, the manager's functions are centralized at the host level across the computer system.

Furthermore, according to the preferred embodiment of the invention, to facilitate performing centralized dynamic I/O connectivity management, the computer system and each instance of the novel manager includes (a) first means, located within each switch, for providing direct host access to the switch controller associated with a given switch; (b) second means, included in each host level instance of the manager, for automatically and dynamically determining the current I/O configuration and connectivity of each host; (c) third means, included in each host level instance of the manager, for performing System Integrated Switching; and (d) fourth means, included in each host level instance of the manager, for insuring the integrity of the I/O connectivity database in a multiuser environment where each user can enter multiple-part commands and processes concurrently through the use of a Floating Master Interlock.

Alternate embodiments of the invention might, for example, perform centralized I/O connectivity management without incorporating the aforesaid means for performing System Integrated Switching. Other combinations of the aforesaid elements can be used by those skilled in that art to meet particular application needs without limiting the scope or spirit of the invention.

The invention features the ability to create the I/O connectivity database in real time without user intervention. The system also features the ability to manage the I/O configuration from a central point (the host level of the system) which accommodates physical distribution of the I/O configuration and eliminates the need for user input at the local device level for system maintenance, reconfiguration, etc., as explained hereinbefore. Furthermore, the invention features the ability to maintain system coherency in a multiuser environment, perform "safe" switching through the use of System Integrated Switching and to assure I/O connectivity database integrity through the use of the novel interlock mechanism.

These and other objects and features of the invention will become apparent to those skilled in the art following more particular description of the preferred embodiments of the invention which are set forth in the detailed description, set forth hereinafter, to be read together with the accompanying drawing in which like numerals in the description indicate like features of the invention shown in the various figures.

BRIEF DESCRIPTION OF THE DRAWING

FIG. 4 also depicts the novel functions performed by the preferred embodiment of the dynamic I/O connectivity manager, and illustrates the relationship of these functions to the domains of the I/O connectivity commands.

FIGS. 6A and 6B joined as shown in FIG. 6 depicts an illustrative example of a physical configuration managed by the novel I/O connectivity manager, in schematic diagram form, together with an example of control statements that can be used to describe the physical connectivity shown in the schematic.

DETAILED DESCRIPTION

Figure 1:
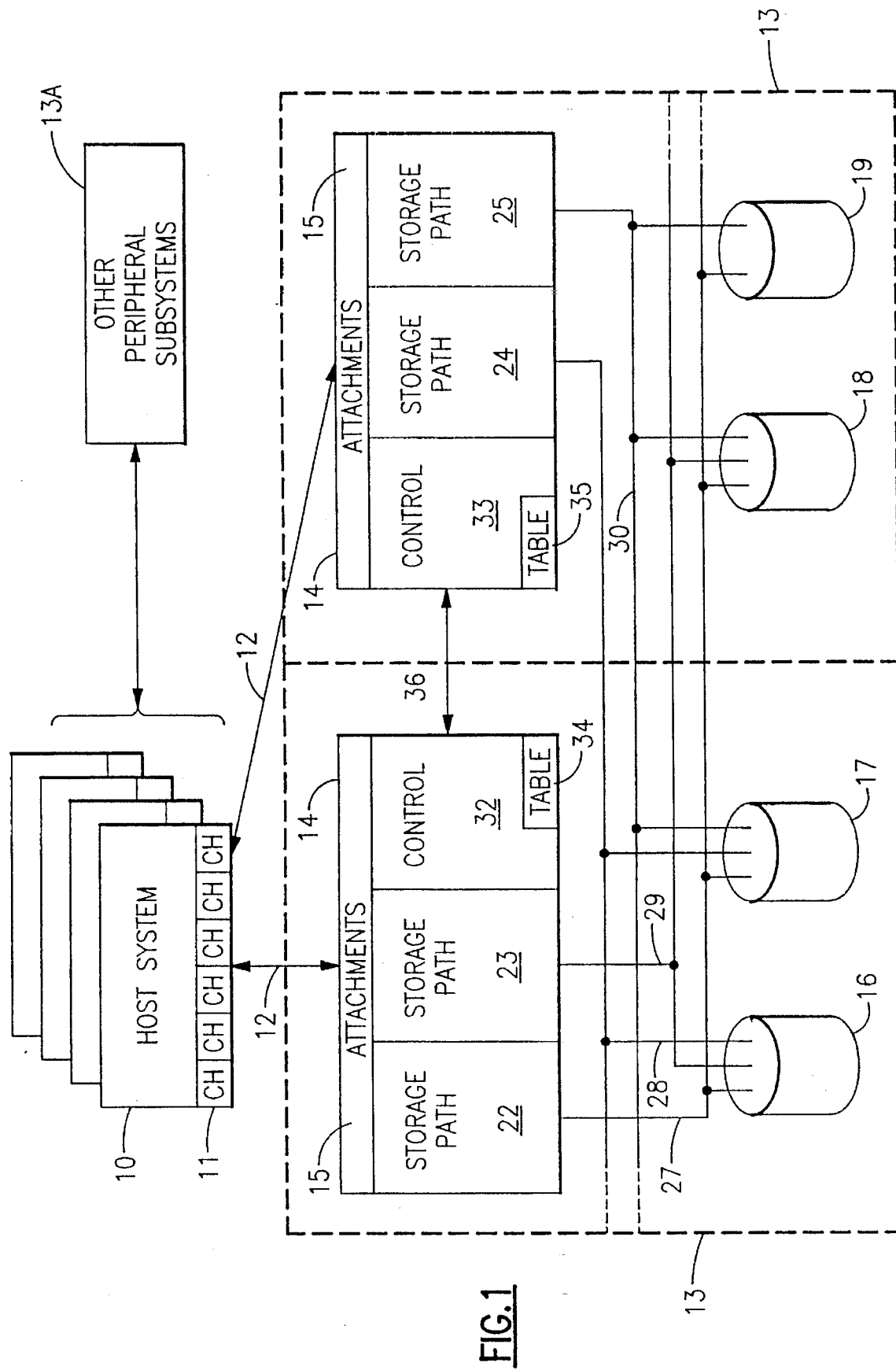
FIG. 1 is a schematic illustration of a system configuration which advantageously uses the present invention.

The present invention is best described in the context of a multiple-host system environment of the type depicted in FIG. 1. FIG. 1 depicts a plurality of host systems 10 attached to a plurality of peripheral data storage subsystems 13. Additionally, host systems 10 attach to a plurality of other peripheral subsystems 13A as is known. Each of the host systems 10 includes a plurality of channels CH 11, which respectively connect to the peripheral subsystems 13, 13A via paths 12. Each of the host systems 10 may include one or more channel path connections 11 to each of the subsystems 13, 13A.

Some of the subsystems are attached to a plurality of the host systems 10. For facilitating data communications between the respective host systems 10 and the various subsystems, particularly data storage subsystems, so-called channel path grouping may be employed. Such channel path grouping is described in U.S. Pat. Nos. 4,207,609 and 4,396,984, incorporated by reference. In any channel path group, which may include several channel paths CH 11, the host system can request a peripheral action such as data storage from a given subsystem 13. Subsystem 13 may respond to the request over another channel path within the path group. Such dynamic pathing is controlled in part by the storage subsystems as explained in '609. The dynamic pathing may extend across a plurality of subsystems 13 as explained in '609.

Each of the subsystems 13 includes a control unit, also referred to as a storage control 14. Each of the control units 14 includes a plurality of channel attachments 15 which are electrically and logically connected to the channel paths 11 of the respective host systems 10. The purpose of the control units 14 is to intercouple the host systems 10 on a selected basis to any one of a plurality of data storage devices as shown in the drawing. A plurality of devices 16–19, are connected to the control units 14 for data communications with the various host systems 10.

Each of the control units 14 can be constructed in a manner similar to that used for constructing the IBM 3880 type of control units. Each storage path 22–25 includes a microprocessor and associated electronic circuits for transferring data signals between devices 16–19 and the various host systems 10. Controls 32 and 33 in the respective control units 14 provide for general control of the control units 14 including maintenance procedures in the form of diagnostic circuits. A pair of tables 34, 35 in the respective control units 14 contain a joint array structure as described in copending Patent application Ser. No. 089,151, filed Aug. 25, 1987, assigned to the same assignee as the present invention, and path group information corresponding to the dynamic pathing memory 25' of U.S. Pat. No. 4,207,609. Double-headed arrow 36 represents the electrical and logical interconnections between control units 14 for achieving the communications represented in U.S. Pat. No. 4,207,609. All of the internal portions of the control units 14 including attachments 15, storage paths 22–25, controls 32, 33 and tables 34, 35 are electrically and logically interconnected as is known and as is practiced in the IBM 3880 storage controls.

The electrical and logical connections between the control units 14 and devices 16–19 may use a so-called string connection when characterized by a string controller which is attached to the respective devices in the string. As an example, numerals 27–30 represent respective string connections between control units 14 and devices 16–19. Each of these connections includes a controller (not shown, such as the controller used with the IBM 3380 storage unit) for providing control and data transfers for devices 16–19 by the control units 14. Thus, several of the devices may be connected to the two subsystems 13, i.e., there are cross-connections.

The control units 14 may provide for dynamic path selection between devices 16–19 and the various channel path groups. The storage paths 23 and 24 can access any of the devices 16–19 which they are connected to by the various string connections 27–30.

In accordance with the invention described in copending application Ser. No. 251,969, a command request initiated in a peripheral subsystem 13 is transmitted to the cognizant host systems 10 for quiescing portions of the subsystems for facilitating maintenance or other related procedures. Quiescing is making a resource such as a device 16-19 as defined above not available to any of the host systems 10. In host processor vernacular, quiescing is equivalent to varying a device offline. Upon completion of the maintenance procedure, a resume command request is sent from the subsystem 13 to the cognizant host systems 10 indicating that normal operations with the quiesced device may be resumed.

As indicated hereinbefore, it would be desirable to dynamically manage I/O subsystem connectivity from the host level of the computer system versus the "bottom up" approach taught in the prior art.

The invention can be best described in terms of FIG. 1, with the addition of at least one switch along path 12, i.e., the invention will best be appreciated in a system that provides for switchably coupling each peripheral device to a channel.

Figure 2:
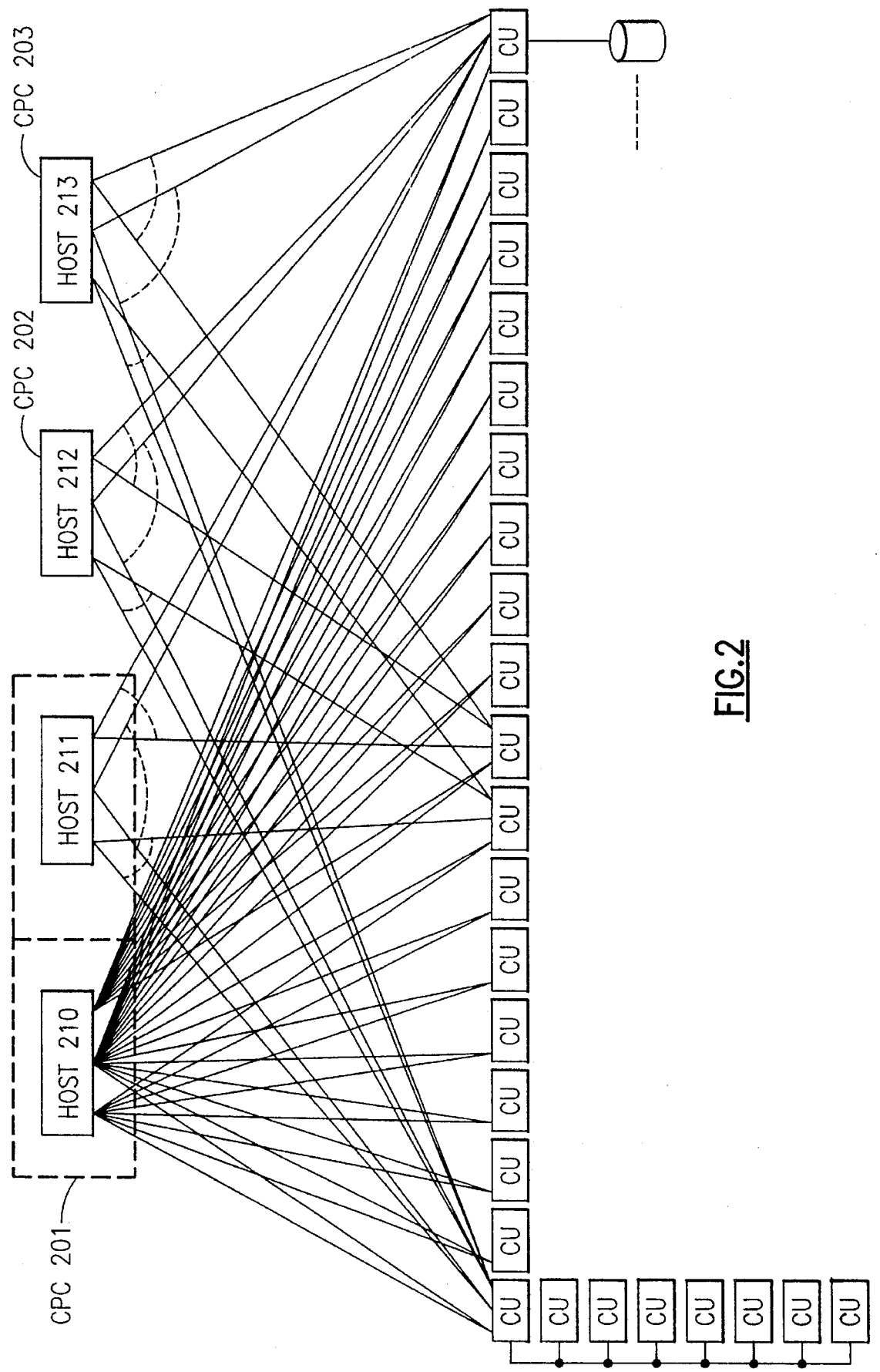
FIG. 2 is a high-level block diagram representation of the system depicted in FIG. 1.

FIG. 2 is a high-level block diagram representation of the system depicted in FIG. 1. FIG. 2 depicts three central processing complexes (CPC 201, CPC 202 and CPC 203) with four operating systems (hosts 210, 211, 212 and 213) interconnected via channel subsystems (not shown) to a plurality of device CUs and devices. Twenty-six CUs are shown directly connected to the hosts.

It should be noted, with reference to FIG. 2, that reconfiguration requires re-cabling and would be disruptive insofar as adding, deleting or servicing CUs is concerned. Additionally, the CUs shown in FIG. 2 are all located within approximately 400 feet of each CPC taking into account cable limitations and the feasibility of coordinating operator action at each host and CU.

Figure 3:
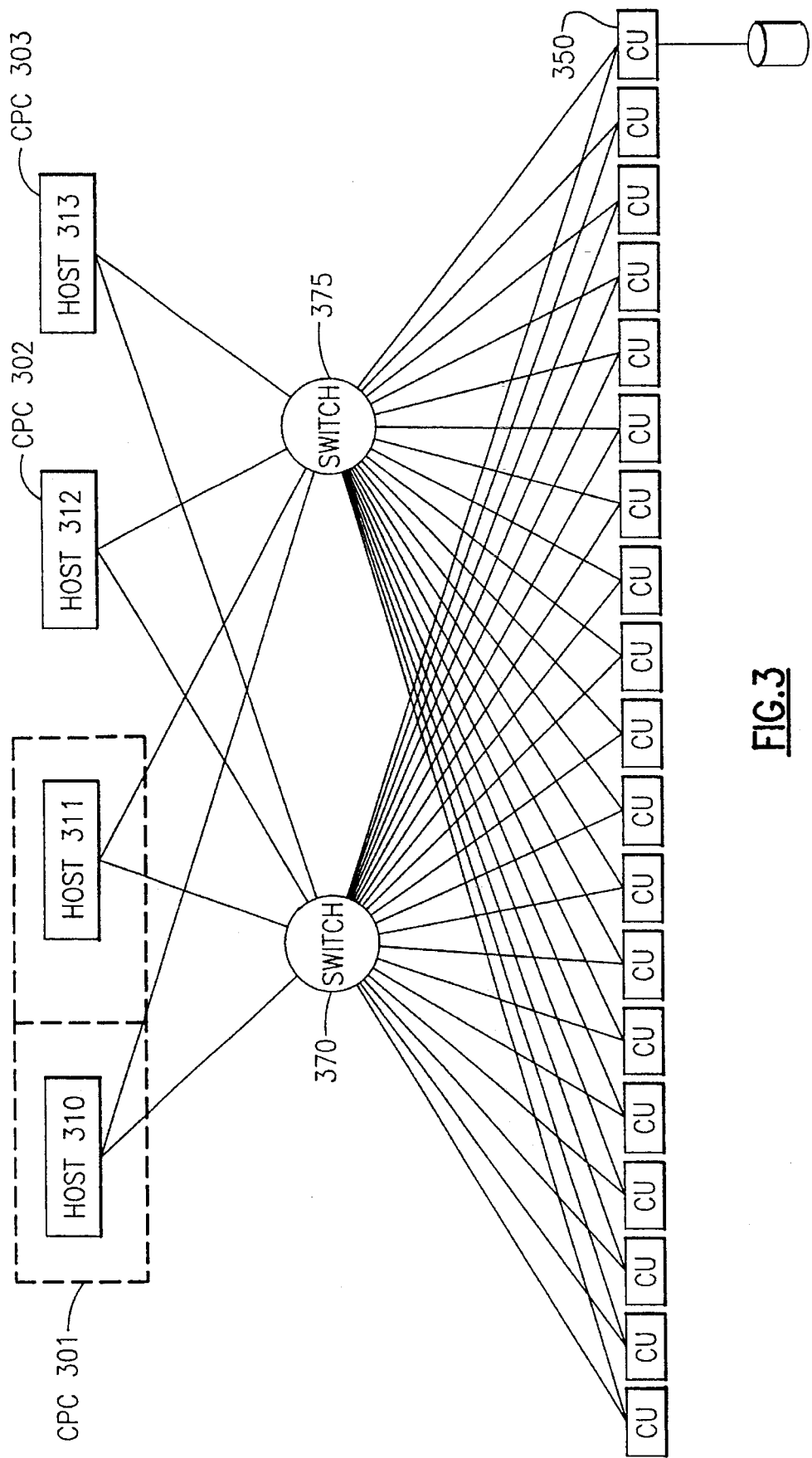
FIG. 3 is a high-level block diagram representation of the system depicted in FIG. 1 with the addition of switches interposed between each depicted host and the various devices coupled thereto via the switches.

FIG. 3 is a high-level block diagram, similar to the one in FIG. 2, but with the addition of switches interposed between each depicted host and the various devices coupled thereto via the switches.

In FIG. 3, CPCs 301, 302 and 303, again with four hosts, 310, 311, 312 and 313, are shown coupled to 19 CUs, like CU 350. In FIG. 3, however, switches 370 and 375 are used to reduce the number of physical connections over the number required in FIG. 2, provide for system reconfiguration and provide for CPC device sharing via switches, etc. As indicated hereinbefore, while the use of switches and fiber optics has increased device connectivity possibilities, configuration flexibility and the ability to separate system components, the complexity of performing I/O management has also increased. It is in the context of a system such as the one depicted in FIG. 3 that the invention finds significant utility. It is also in the context of FIG. 3 that the preferred embodiment of the invention is described hereinafter.

Figure 4:
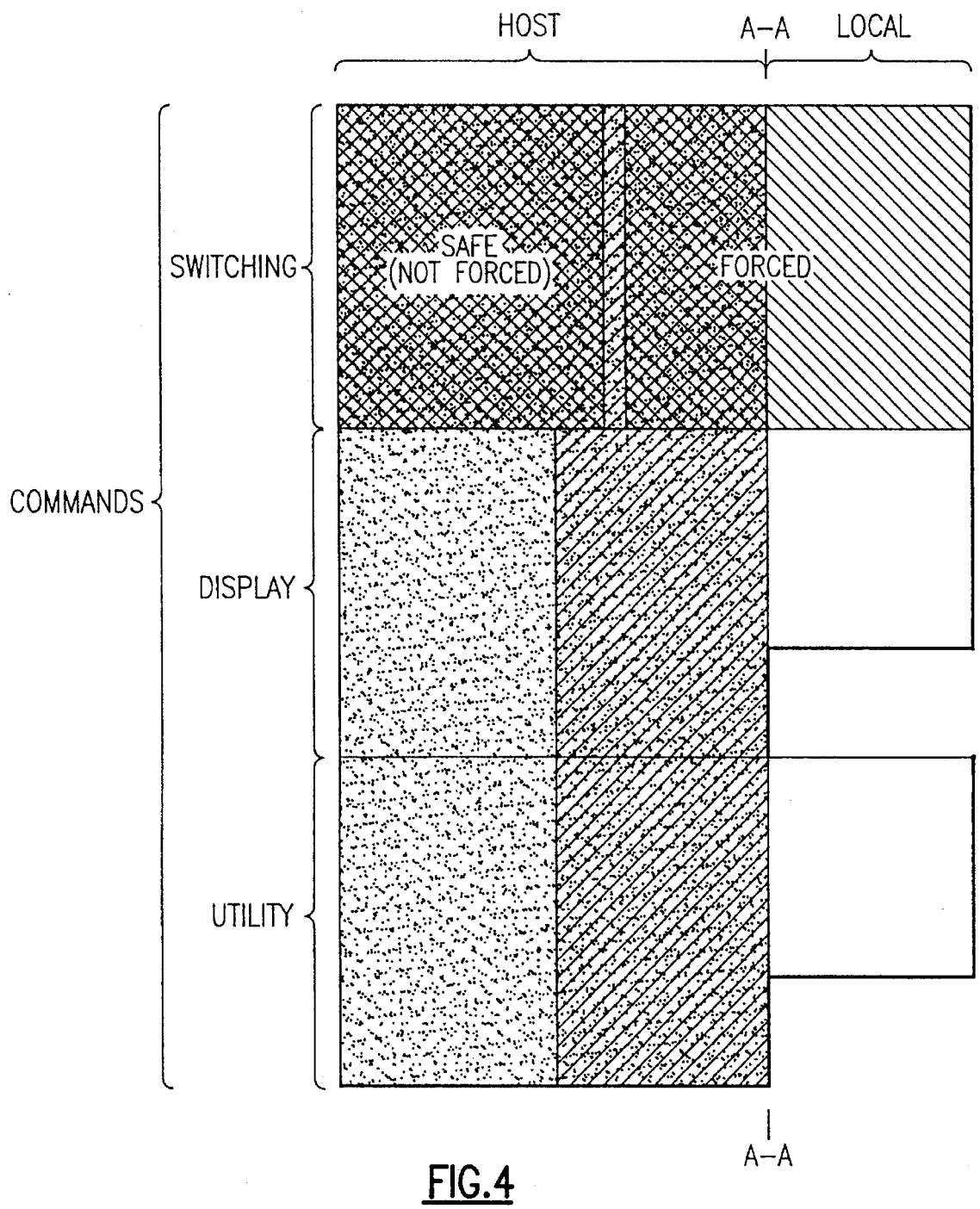
FIG. 4 depicts, in Venn diagram form, an overview of the domain of host-based I/O connectivity management commands (functions) compared with domain of I/O management commands that, according to the prior art, are performed locally at the device level.

FIG. 4 depicts, in Venn diagram form, an overview of the domain of host-based I/O connectivity management commands (functions) compared with the domain of I/O management commands that, according to the prior art, are performed locally at the device level. FIG. 4 also depicts the preferred components of the novel dynamic I/O connectivity manager, (hereinafter referred to as the "Manager") and illustrates the relationship of these functions to the domains of the I/O connectivity management commands.

The right hand side of FIG. 4 (on the right side of line A—A) depicts the existence of commands for performing switching, display and utility functions from the local level of a computer system, as typified by copending application Ser. No. 251,969.

It can be seen with reference to FIG. 4 that switching commands managed from the local level are, according to the prior art, "forced". That is, the System Integrated Switching capability referred hereinbefore does not exist in local switching systems or control unit-based I/O management systems. The cross hatched areas of the diagram to the right of line A—A indicate that all display and utility commands that can be performed centrally, cannot be performed locally. For example, it is not possible with known locally based I/O management systems to display information about a channel or to direct a switch to perform error reporting to the host(s) to which the switch is attached.

On the other hand, the left side of line A—A depicts the flexibility of the Manager being described herein. The invention permits (a) an option of performing switching on a "forced" or "safe" (System Integrated Switching) basis from a host-based Manager; (b) the ability to access the switch controller directly (all host-based switching commands and at least some display and utility commands e.g., displaying the status of a switch port, or naming a switch port, etc., are shown using the direct access-function); and (3) all the host-based commands are shown to require some level of interlocking and dynamic I/O connectivity database generation. The preferred embodiment of the Manager can perform all of the functions shown on the left side of FIG. 4 intersecting with the various host-based command types shown.

The primary function of each instance of the Manager is to control switches, displays and utility functions (i.e., to execute the command types shown in FIG. 4) from the host level of a computer system like the one depicted in FIG. 3.

Each instance of the Manager preferably has the ability to directly access switch controllers, dynamically create the I/O connectivity database, perform "safe" switching, and perform integrity interlocking using the Floating Master function. However, as will be explained hereinafter, the Manager need not have all these capabilities and yet can function to achieve many of the aforestated objects of the invention.

Each of the desired features of the Manager will be described in detail following a summary of the operation of the integrated whole i.e., an overview of the function of a computer system that includes a Manager embodying all the principles of the invention.

Each instance of the Manager may be used to control one or more switches from a single host. The invention contemplates using Manager commands to control connectivity of system resources. For example, according to one embodiment of the invention, a "CONNECT" command can be used to enable communications between a channel port and a CU port when the channel and device control units are attached to a switch. The Manager will create a channel program of one or more switch commands to effectuate a Manager command.

To create the correct switch command(s) in response to an end user (e.g. operator) entered Manager command, the Manager must have access to current configuration data. Dynamic I/O connectivity database generation and direct access to switches will be described in greater detail hereinafter, but for the present it should be noted that the Manager must retrieve some configuration data from the host's Channel Subsystem and must also retrieve the connectivity data from one or more switches. The Manager determines the switch controllers that are accessible from the host operating system when the Manager is initiated. After having determined the device number of each switch controller, the Manager can read the current connectivity of the switch ports.

Figure 5:
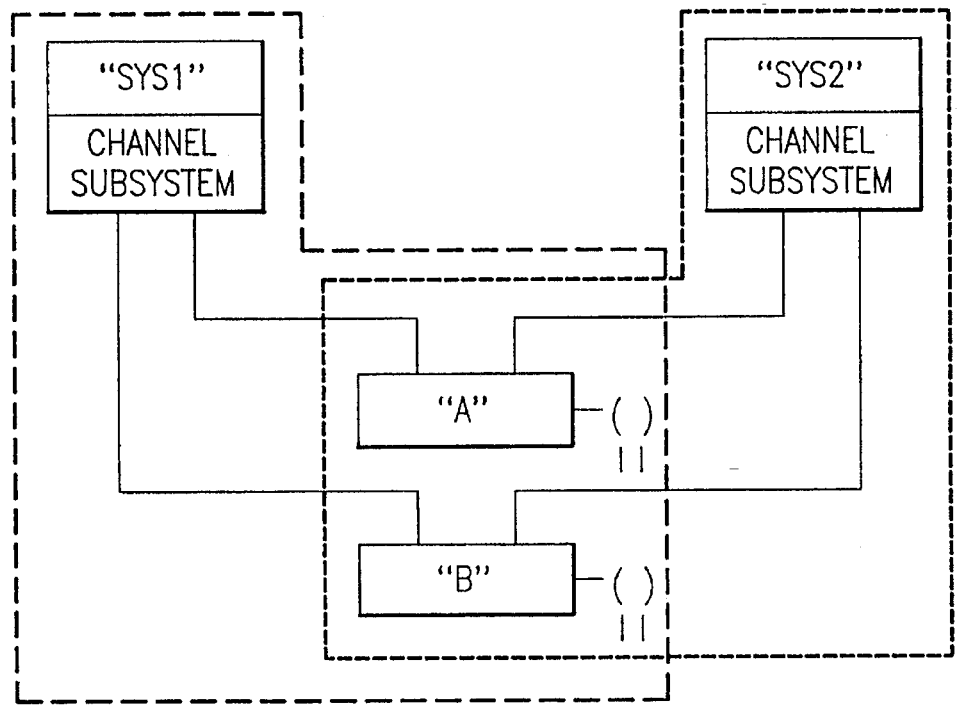
FIG. 5 depicts the elements in the I/O connectivity database of two exemplary systems.

Therefore, the Manager "database" is actually a combination of what the host CSS "knows" and what the switches "know", as shown in FIG. 5.

In FIG. 5, "SYS1" and "SYS2" are host operating systems. "A" and "B" are switches with stored configuration data. "@" surrounds SYS1's database. "." surrounds SYS2's database.

It should be noted that, according to the invention, all data collected from each CSS is specific to the host collecting the data. Furthermore, all data collected from switches is common across multiple instances of the Manager. That is, every Manager will have the same data from the same switch.

For all instances of the Manager to have the same switch data, each instance must have access to the same set of switches. If a switch is not available to a host, that host will not have access to that switch's data. This will be explained hereinafter with reference to the "domains" of switches and instances of the Manager.

According to the preferred embodiment of the invention, multiple Managers accommodating a common switch are permissible. Data base integrity is ensured through the use of a switch "key" which will be explained in more detail hereinafter.

The database need not be saved. According to one embodiment of the invention, it is created dynamically when the Manager is started using host-based instructions and I/O to the switch controllers. The database can in fact be a control block structure created and maintained in virtual storage.

For any single instance of the Manager there is no requirement for external data, i.e., user input to the Manager to create the database. Each Manager's data requirements can be satisfied via the use of the CSS and directly accessible switch data. Thus, according to the invention, the Manager works with a "self-defined database".

Figures 6, 6A:
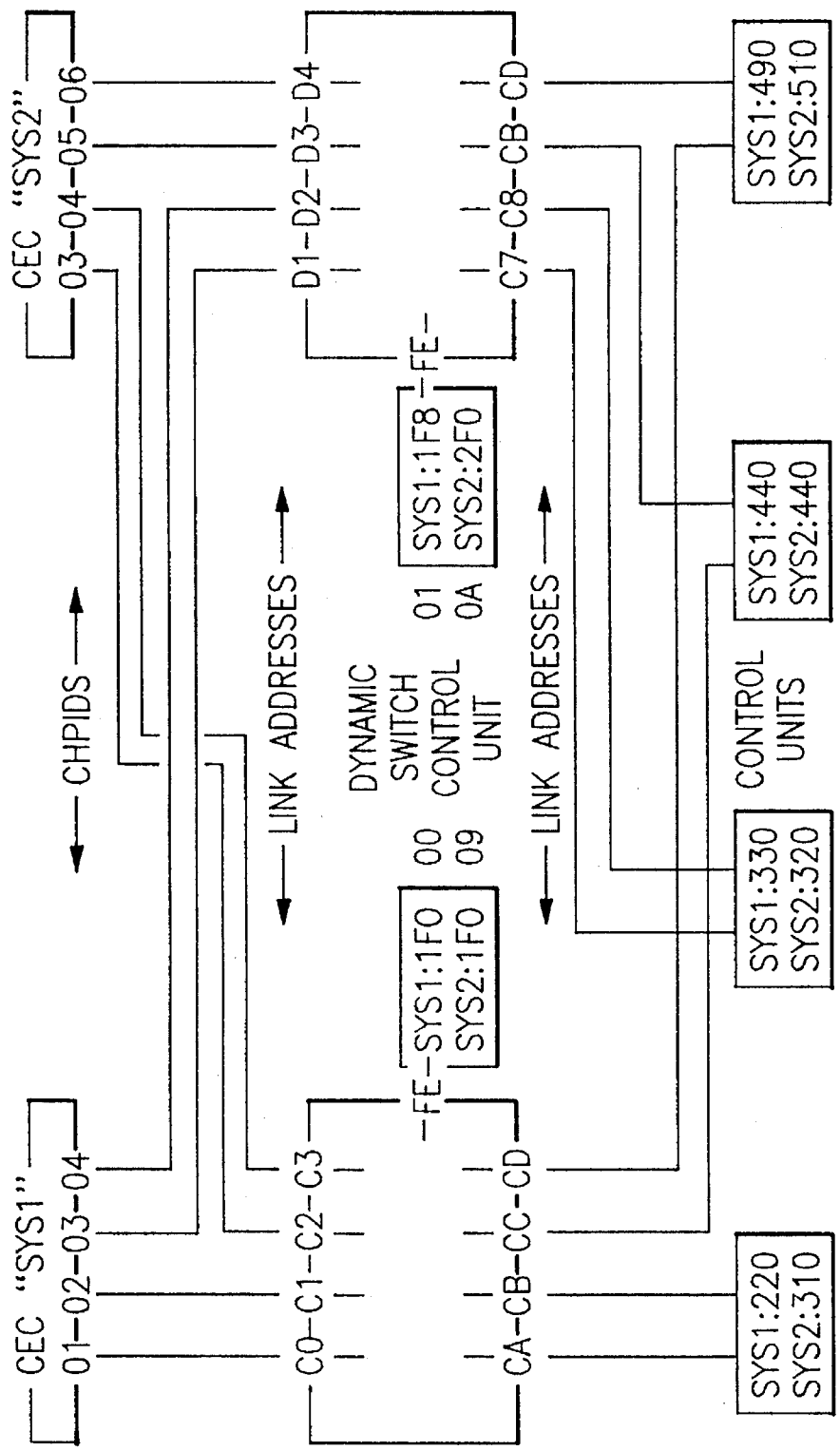

Reference should be made to FIG. 6 to see an example of portions of a possible configuration and data to define it to the host or channel subsystem. The example is for the sake of illustration only.

FIG. 6A shows a schematic diagram of a physical layout and how switches are placed between channels and CUs. FIG. 6B depicts an example of control statements which can be used to describe the physical connectivity shown in FIG. 6A. These control statements indicate how the physical layout can be conveyed to the CSS and to the host.

Figure 7:
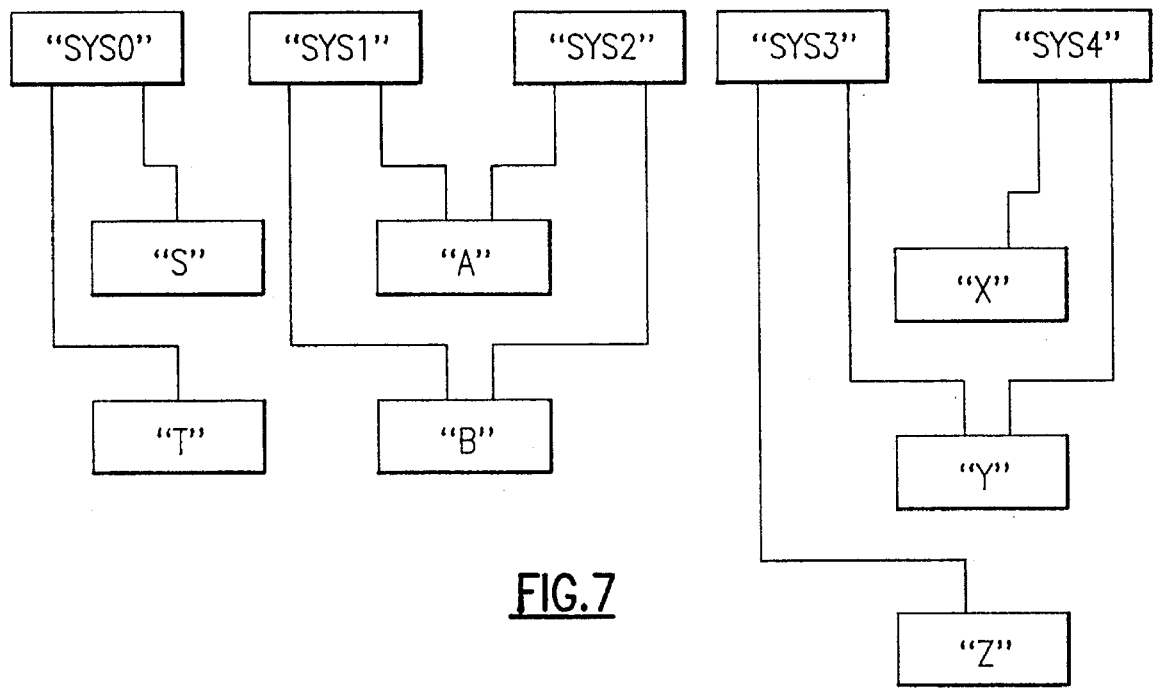
FIG. 7 illustrates several I/O manager domains in relation to switch domains.

The concept of host and switch domains is a useful tool for explaining the invention. If a host is physically connected to a switch, that switch is said to be in the domain of the instance of the Manager on the host. For example, with reference to FIG. 7, A and B are in SYS1's domain and SYS1's domain contains only A and B. All of the Manager domains that contain a specific switch are in that switch's domain. For example, in FIG. 7, SYS1 and SYS2 are in A's domain and A's domain contains only SYS1 and SYS2.

If the domains of all the switches in a Manager's domain are the same and contain only one Manager, the Manager is said to have an exclusive domain. For example, in FIG. 7, SYS0 has an exclusive domain of S and T.

If the domains of all the switches in a Manager's domain are the same and contain more than one Manager, all of the Managers are said to have equivalent domains. For example, in FIG. 7, SYS1's and SYS2's domains are equivalent, and A's and B's domains are equivalent.

Finally, if the domains of all the switches in a Manager's domain are not the same, the switch domains are said to be disjoint. For example, in FIG. 7, SYS3's domain is disjoint with SYS4's domain. Also, X's, Y's and Z's domains are disjoint.

Figure 8:
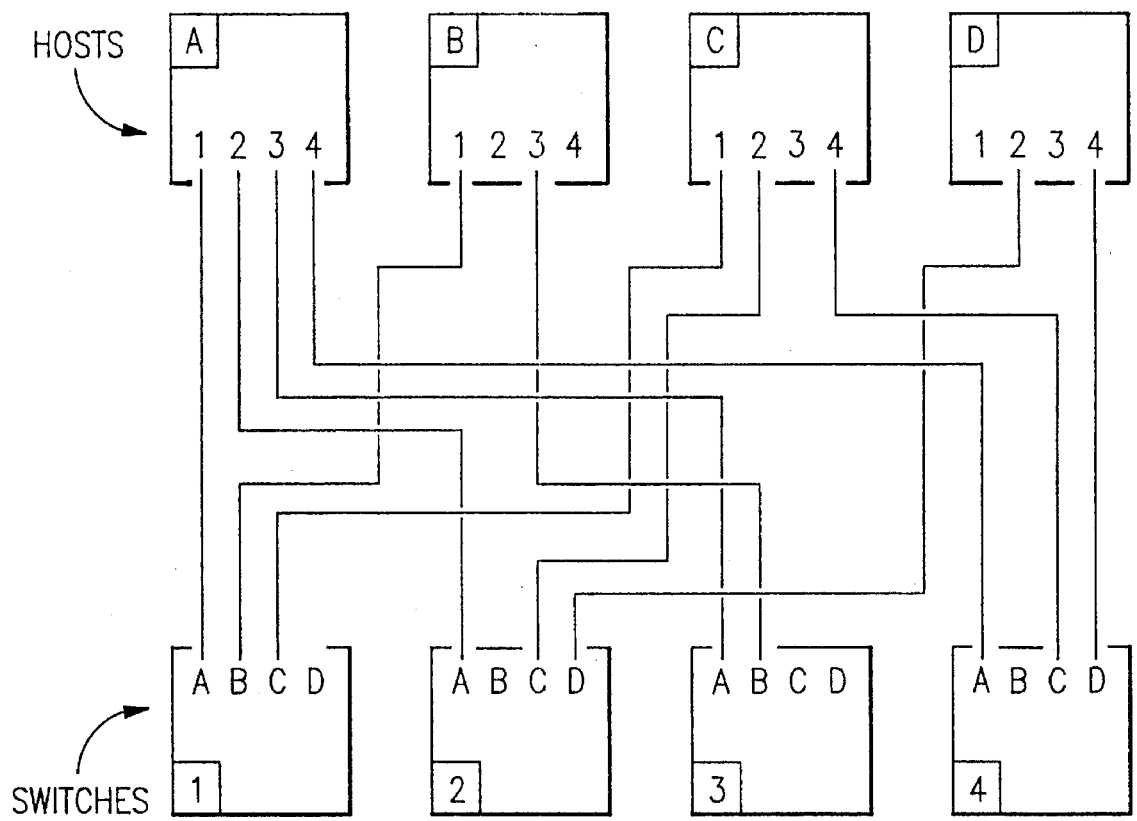
FIG. 8 depicts a possible configuration of hosts and switches which is useful in explaining the I/O manager connectivity database.

Reference should now be made to FIG. 8 which shows a possible configuration of four operating systems (A–D), each containing an instance of the Manager, and four switches (1–4), each having disjoint domains. As used hereinafter, the Manager which is the source of a command to one or more switches is referred to as the Primary Manager. If the command changes connectivity, the Primary Manager uses existing system hardware and software to transfer data and commands between instances of the Manager. This feature is defined herein as "Inter-System Communication." Any Manager which receives a command from the Primary Manager through Inter-System Communication is defined hereinafter as a Secondary Manager. The change in connectivity may or may not affect the host where the Secondary Manager resides.

After Manager database initialization the following definitions can be made with reference to the system configuration depicted in FIG. 8:

|  |  | Operating Systems Defined | | | | Switches Defined | | | |
| --- | --- | --- | --- | --- | --- | --- | --- | --- | --- |
|  |  | A | B | C | D | 1 | 2 | 3 | 4 |
| For the | A | Yes | Yes | Yes | Yes | Yes | Yes | Yes | Yes |
| database | B | Yes | Yes | Yes | No | Yes | No | Yes | No |
| on each | C | Yes | Yes | Yes | Yes | Yes | Yes | No | Yes |
| operating system | D | Yes | No | Yes | Yes | No | Yes | No | Yes |

"Yes" means that the entry is known to the Primary Manager. It does not mean that the Primary Manager can communicate with a Secondary Manager, which is a function dependent on each Manager having the Inter-System Communication capability referred to hereinbefore.

A user can create and save programs which use one or more Manager commands that, when executed, cause a specific management action. For example, a user may write a program using Manager commands in order to produce a report or logically connect printer control units comprising a print pool (i.e., allow physical connections to be made) to a processor of the operator's choice.

The preferred embodiment of the invention features the ability to assign logical names to ports, which provides the capability of managing a system at a conceptual level not requiring the user to be familiar with the ports and switches. Furthermore, the preferred embodiment of the invention can use "Vary Path" functions provided by typical operating systems such as IBM's MVS/ESA, to request, via each Manager, affected device paths to be VARYed offline before sending commands to one or more switches which will remove connectivity. Also, Managers can request affected device paths to be VARYed online after sending commands to switches that add connectivity. The process of translating switch ports to device paths and correlating the change in connectivity to an appropriate VARY command is referred to herein as "Logical To Physical Coordination".

It will become apparent to those skilled in the art, with reference to FIGS. 10–15, that through the use of the Vary Path function each Manager has a way to request permission before resources can be switched away. Once again, this gets into the System Integrated Switching capability of the invention (to be explained in detail hereinafter) that can be used to "defend" critical resources.

Those skilled in the art can readily appreciate that the Manager can be designed to operate in a plurality of operating environments. For example, with or without the capability to perform interhost communications, etc. According to one embodiment of the invention, a minimum operating configuration will allow the Manager to accept commands through the system operator console interface, will allow a Manager to perform Logical To Physical Coordination on its host processor, but will not incorporate the ability to communicate with other instances of the Manager.

It is possible for a Manager running in a fully functional mode and communicating with other systems via the Inter-System Communication feature, to lose communication with one or more of these systems because of some event taking place on the affected system. It should be noted that the Inter-System Communication feature utilizes a novel switch-based registration scheme (to be described hereinafter), together with existing system hardware and software, to transfer data and commands between instances of the Manager. According to the preferred embodiment of the invention, Managers are capable of running in such degraded operating environments.

Manager commands may cause changes in connectivity by the initiating host that would not be permitted by other hosts attached to a given switch. Therefore, the aforementioned Inter-System Communication ability is provided so that System Integrated Switching can be performed. It should be recalled that the System Integrated Switching capability is the means by which instances of the Manager running on a plurality of hosts are able to allow or prohibit a switching operation that is initiated on the same or a different Manager host. Using Inter-System Communication, all switching commands are broadcast to all known Manager hosts. When an Inter-System Communication command is received each Manager host must examine the command and determine if the command affects any of its resources and, if so, can the resources be freed. This is accomplished by examining the host's database and by using the Vary Path function. Each Manager host must then respond with a "OK to switch", which means all VARYs were successful, or respond "not OK to switch", which means one or more required VARYs were unsuccessful. In effect, multiple system Logical To Physical Coordination is being performed.

In order to complete the overview of the invention, the concepts of serialization of commands across hosts, serialization of processes across hosts, peer-to-peer operations, and the concepts of "Backout", "Nobackout", and forced switching ("FORCED") need to be explained.

Serialization of commands implies that while a Manager command is in progress, all other commands will be rejected. This occurs not only at the Primary Manager host, but at Secondary Manager hosts as well. Using the communication provided by the Inter-System Communication feature, the "begin" of processing is communicated by the Primary Manager to the known Secondary Manager hosts. This enables the Secondary Manager to reject any command that may be initiated there before any processing begins. On completion of the Manager command, a "complete" is broadcast to enable the Secondary Manager host to now accept subsequent commands.

In addition to serialization on a single command basis, there is also provision in each instance of the Manager to serialize on a process that consists of one or more Manager end-user commands. As with serialization of commands, this implies that while a Manager process is in progress, all other commands entered by another user at any instance of a Manager (Primary or Secondary) will be rejected. Using the communication provided by Inter-System Communication, the "begin" of a process is communicated by the Primary Manager to the known Secondary Manager hosts. This enables the Manager to reject any command that may be initiated there before the process completes. The last command in a Manager process should explicitly enable the Manager hosts to accept subsequent commands from another source. If another user must break into a user's ongoing process, the invention provides a facility for the new user to assume control. According to the invention, this facility (to be explained in detail hereinafter with reference to the "UNLOCK" and "GETLOCK" commands) will insure that command serialization is not broken and that the original user is informed that the new user has assumed control.

Serialization of commands and processes across hosts is made possible by use of the Floating Master Interlock capability of the invention, which is described in detail hereinafter.

According to the preferred embodiment of the invention, each host that runs the Manager has functional abilities equal to every other host that runs the Manager. That is, there will be no single Primary Manager with all other Secondary Managers subservient to it. This is referred to as the peer-to-peer feature of each Manager. The Primary Manager host is changeable to whichever host is the source of the Manager command.

However, according to the preferred embodiment of the invention, all access to switches by instances of Manager is serialized. This insures that switching commands causing reconfigurations are implemented and not overwritten by another Manager before all required reconfiguration has taken place. That is, a Primary Manager host is in control (vis-a-vis other instances of Manager) of all the switches that it must control to perform the Manager command until the Manager command has completed, after which, any Manager host can gain access to one or more of the aforementioned switches. It should be noted that Managers may not need to communicate with every switch to execute a given command.

Since multiple device paths and multiple systems can be affected with one switching operation which would cause multiple Vary Path functions to be attempted, there is a possibility that at least one VARY is successful and that at least one VARY is unsuccessful at the same time. In such a case, the Manager must be able to return to the state held before the Vary Path function was invoked. That is, successful VARYs must be undone. This process is called "Backout".

Backout is performed on a "best effort" basis. This means that, according to one embodiment of the invention, the command is considered complete once Backout has been initiated. The command process may not wait for Backout to complete. This is because Backout is essentially a recovery operation, and recovery procedures for Backout failure might become unmanageable.

For multiple switch commands, whenever one or more switches fail to execute an update command (due to contention or device errors), all switches are reset to the state they were in before the command was executed. This is referred to as "Switch Backout". Logical To Physical Coordination Backout is also performed when one or more switch updates fail.

Notwithstanding the above, there will be instances when the end-user/operator will not want to return to the state held before the Vary Path function was invoked. That is, the operator may want to leave alone the VARYs that were successful, and/or the switch changes that were successful. This process is called "Nobackout" and is a user option according to the preferred embodiment of the invention.

Finally, to complete the overview of the invention, it should be noted that it may be desirable to allow some switching operations to be unconditional without regard to the loss of resources, e.g., when a backup system is used to recover a failed primary system. In such a case, one embodiment of the invention provides a "FORCED" option which can be used as a parameter on the Manager command. Neither Logical To Physical Coordination Backout nor Switch Backout is performed when the FORCE option is specified on a command.

Having provided an overview of the operating principles of the invention, each of the preferred features of the invention, namely the ability to directly access switch controllers from the host level of the computer system; to dynamically create the I/O connectivity database; to perform "safe" switching; and to perform integrity interlocking utilizing the Floating Master Interlock function, will now be described.

First, with respect to the ability of the Manager to have direct access to switch controllers, it should be recalled that the switches are normally transparent to programming with no capacity to communicate with the host and that means for providing remote control of switching functions is needed.

It should also be recalled that dynamic switches operate by making connections when they are needed, and breaking the connections when they are no longer needed using connect and disconnect delimiters. This structure is transparent to programming. In order to control the switch, report errors, status, etc., the invention calls for a dynamic switch control unit. The dynamic switch control unit receives commands from host programs (e.g. instances of the Manager), operates the switch hardware, and sends both status and error information to the host via programming interface operations normally used for device control units, not switches.

Figure 9:
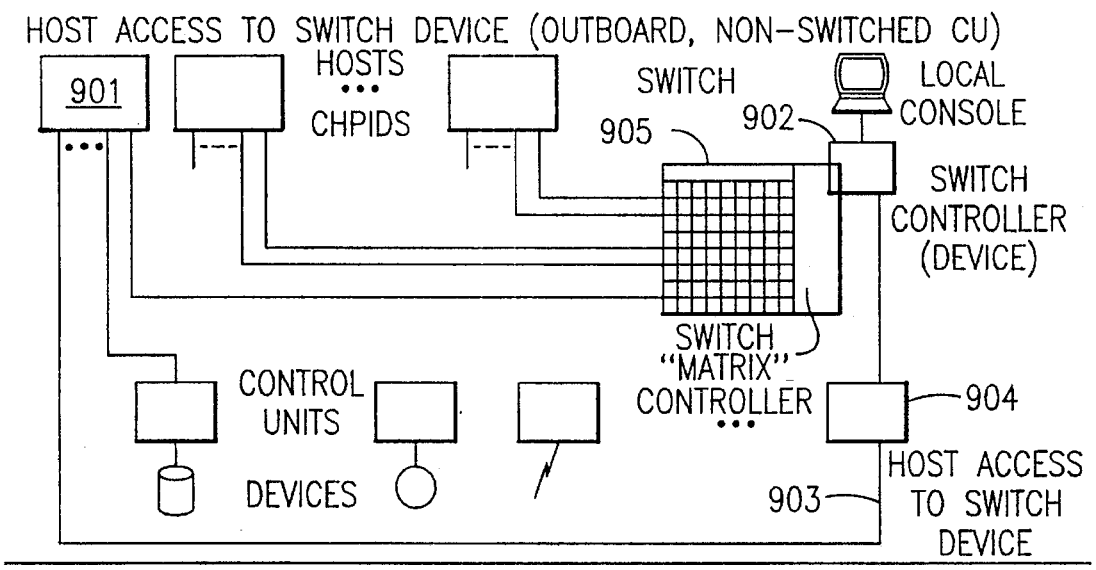
FIG. 9 depicts two prior art computer system configurations which permit a host to access a switch device, together with a computer system configuration which permits direct host access to a switch device in accordance with the teachings of the invention.
Figure 9:
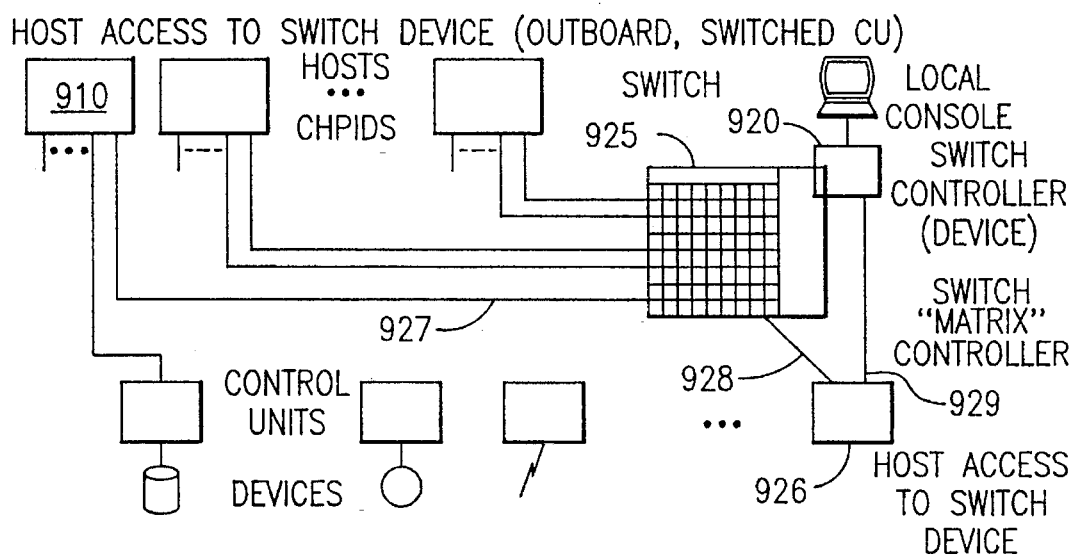
Figure 9:
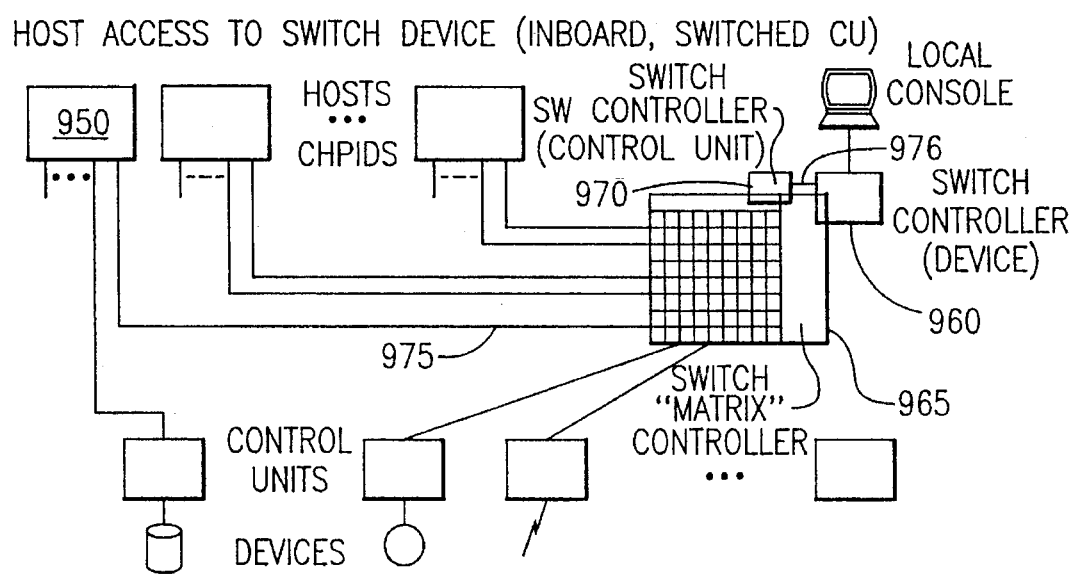

Before describing illustrative operations that can be performed on switches over the programming interface, reference should be made to FIG. 9. FIG. 9 depicts two prior art computer system configurations which permit a host to access a switch, together with a computer system configuration which permits direct host access to a switch in accordance with the teachings of the invention.

The first configuration shown in FIG. 9 (top of the figure) illustrates host access to a switch controller via a CU and a data path that circumvents the switch. In particular, host 901 is shown to access switch controller 902 via path 903 and CU 904, completely independent of switch 905. This is referred to as an outboard, non-switched CU approach for providing host access to a switch device.

The centermost configuration illustrated in FIG. 9 depicts an outboard, switched CU approach to providing host access to a switched device. In particular, host 910 can be seen coupled to switch controller 920 via switch 925, CU 926 and data paths 927,928 and 929.

Finally, the novel inboard switched CU approach which, according to the invention, is used to provide host access to a switch device, is illustrated in the remaining configuration depicted in FIG. 9. In particular, host 950 is shown coupled to switch controller 960 directly via switch 965, the novel dynamic switch control unit, 970, and data paths 975 and 976.

The new functions performed over the programming interface, according to the preferred embodiment of the invention, include using the interface for reporting error status, for providing identification of the switch and its ports, and for providing identification of the control units or channels that are communicating with the ports (the neighbors).

Dynamic switch control unit 970 has a unique identifier which can be stored on a resident diskette. The identifier can be read by the host over the programming interface. The information from the switch about neighbors can be used in system fault isolation.

According to the preferred embodiment of the invention, ports are assigned physical addresses which are taken from the board and card wiring. These physical addresses are mapped into logical addresses which are available to programming. Spare ports each have their own physical address. Each address can be mapped into the logical address of a failed port. Thus, when the spare ports are activated, programs do not have to change since they work with logical addressing.

Furthermore, according to the preferred embodiment of the invention, switch control is accomplished by commands that prevent certain dynamic connections from taking place. In one embodiment of the invention, the commands have three forms: blocking, dedicated connections and partitioning. These commands can be entered locally or can be entered at the host level where the Manager can be used, for example, to perform System Integrated Switching.

Blocking can be used to prevent all access to and from a port. This can be used to isolate a failing channel or control unit from the rest of the system.

Partitioning can be used to isolate one group of ports from another group of ports. This can be useful in preventing an operating system that is under test from interfering with a production system's I/O devices. The partitioning is specific to ports such that the partitions can be completely separate, or they can share some common ports (enabling them to share common I/O).

Dedicated connections are used to provide a path that is present for long periods of time. This allows a control unit to communicate with a channel where the control unit does not have the discipline to handle making and breaking of connections while operating. This function is used by protocol converters. The function can also be used to form a path through one switch to another switch.

According to the invention, a host data buffer, located at the switch, is provided in order to allow a common communication area for host programs (in particular the Manager) residing in different hosts attached to the switch. Each Manager registers in this area to facilitate the Inter-System Communication function referred to hereinbefore. Since the information is outside the host, it is not lost when a host crashes or is powered off. The buffer is backed up by a non-volatile medium in order that this information is not lost across power on-off cycles of the switch. Commands to read and write this buffer are used to provide access from any of the hosts.

If a host program is going to control a switch, the preferred embodiment of the invention contemplates the dynamic switch controller entering a local operator alert mode. When enabled, this facility causes a local operator to be warned should he attempt to modify any of the switch control parameters (block, partitioning and dedicated connections).

As indicated hereinbefore, a "key" mechanism is provided at the switch to allow control from multiple processors and the local operator console. The key mechanism is a counter which can be read or tested and/or incremented. The counter is also incremented should any changes be made to connectivity parameters by the local operator. All changes to connectivity by host programming must be preceded by a test key and increment command, in which the key provided equals the counter value. This assures a program that no other host program, or the local operator, has changed the control parameters since the program read the information upon which its change is based. While similar key counter control functions have been used on processors, this is the first application known which applies a key counter function to switches per se.

The key counter mechanism is utilized by the Manager to ensure that proper configuration data is being processed and allows the Manager to detect interference from other sources, e.g., a local operator.

The invention also provides the ability to control switch configuration in case of processor failure by interrupting the failing processor's communication with the dynamic switch control unit.

Finally, the preferred embodiment of the invention also provides the ability to access port status information and error information stored at the switch level. A switch is given the ability to initiate communication to a host in the event of special conditions such as having to report an error. The prior art problem of determining where to report when multiple processors are functioning (and each processor is requesting a report), is solved by asynchronous error reporting to a primary asynchronous error reporting location. The reporting path can be set up upon installation of the host program. Once such a path is set, it is maintained in the dynamic switch control unit (on a diskette) and is saved when the switch is powered down. The path is restored when power comes back up. Alternate paths can be established for error reporting as well. In this manner, consistency of reporting to the various host processors is assured.

In summary, the provision of direct access to the switch controller by the Manager on each host facilitates direct, coherent control of switches from a centralized point (i.e., from across the host level of the computer system via instances of the Manager). Use of the dynamic switch control unit as described hereinabove, allows direct host access to switches (and their associated switch controllers) that are transparent to normal computer systems and which operate such that each instance of the Manager can determine the existence of other instances of the Manager operating on other hosts via the aforementioned switch-based registration protocol. Accordingly, a principal objective of the invention is met.

In addition to the direct switch controller access feature, the preferred embodiment of the invention features the ability to dynamically generate the I/O connectivity database. It should be recalled that it is an object of the invention to automatically query a computer system's channel subsystem so that each host can dynamically determine the entire I/O configuration attached thereto and determine connectivity. This feature will now be described in detail.

First, two definitions. A "dynamic I/O connectivity database" is defined herein in terms of a method that can be used by a computer program to determine the current I/O configuration without a predefined definition.

The term "database" is defined herein to describe the data structure that is defined to contain the I/O configuration description for retrieval by the program. This is a collection of data fundamental to the program. The data is not for general, system wide use, nor is it generally accessible through system services.

I/O instructions generally require CPC intervention to control the channel subsystem operation. The CPC interprets the I/O instructions, manipulates and performs the functions in the channel subsystem. Preferably the embodiment of this invention uses I/O instructions that allow the program to communicate directly with the channel subsystem to control the channel subsystem operation. By using these instructions, many I/O-related functions and information such as self-description, configuration information, I/O path information, etc. are accomplished without CPC intervention.

Thus, the invention builds a current, correct, I/O connectivity database without any user effort. The invention builds this database by using established system interfaces. The user does not have to provide an additional input source, nor invoke an additional process to convert the input into a form that is usable by the invention. So, the user has less work, and there is less chance of errors or omissions that make multiple I/O connectivity databases unsynchronized.

Also, the database generation mechanism (preferably a program) dynamically identifies itself to other instances of the mechanism via the Inter-System Communication feature. The identity of the other instances of the Manager is also kept in the I/O connectivity database.

The unique features of the dynamic I/O connectivity database generator are that no product specific user created configuration input is required; the generator builds its database using existing, formal, system interfaces; the generator dynamically determines the number of switching units in the configuration; the generator dynamically determines the device address of each switching unit; and the generator dynamically determines the number of instances of the generator that it can establish communication with. It also determines the relationship between instances of the generator and the Switching Units that each instance of the program knows of.

In order to implement a dynamic I/O connectivity database generator, the following concepts, functions and services are used.

1. A mechanism that the generator can use to get information from the Channel Subsystem about the defined I/O configuration as described hereinabove.

2. A mechanism where all Channels, Switching Units, and Control Units have unique (physical) identifiers.

3. Mechanisms whereby each Channel, Switching Unit, and Control Unit will:

(a) supply this identifier through means of a command;

(b) request the identifier from its "neighbor" unit for its own identifier;

(c) respond to requests from its "neighbor" unit for its own identifier; and (d) supply the "neighbor" identifier through means of a command.

4. A mechanism where a channel may determine if it is attached to a switching unit, or if it is directly attached to a control unit.

5. If the channel is attached to a switching unit:

(a) A mechanism where a channel may determine the unique identity of the interface on the switching unit where the channel is attached i.e. its "link address".

(b) A mechanism where a channel may determine the unique identity of the switching unit interface that responds to switching commands.

The step 5(b) identity will be referred to hereinafter as the Switching Control Unit Interface, because this is the interface of the Switching Unit where there is a Control Unit attached that provides I/O services for the Switching Unit Device image. This interface has its own link address.

There exist protocols to allow a channel or a control unit to acquire a unique link address during initialization which will allow it to communicate through a dynamic switch that uses this link address to determine dynamic switch connections. The protocols also provide a means by which a channel or control unit can acquire a unique link address when either a dynamic switch is not present or the connection through the dynamic switch is static (dedicated). These protocols eliminate the need for manual assignment of unique addresses and allow for dynamic reconfiguration.

One function provides a means by which an unidentified unit (channel or control unit) acquires its assigned link address. A signal is sent whenever a unit is unidentified and is attempting to initialize. The action taken by a unit that receives the signal depends on whether the receiving unit is identified or unidentified. If the receiving unit is identified the action taken depends on whether the receiving unit is a channel, a dynamic-switch control unit, or a control unit other than a dynamic-switch control unit. A signal received by either an identified channel or dynamic-switch control unit (a dynamic switch control unit is always identified) causes a response to be sent. The destination link address used in the response is the link address provided to the channel or dynamic switch for the unidentified unit from which the signal was received. The source link address used in the response is the link address of the channel or dynamic switch. A signal received by an identified or unidentified control unit causes a rejection to be sent. The unidentified unit that sends a signal and receives a response adopts the link address contained in the destination-link-address field of the response as its assigned link address and becomes identified. A signal can be sent by either a channel or control unit. A signal is not sent by a dynamic-switch control unit.

Figure 10:
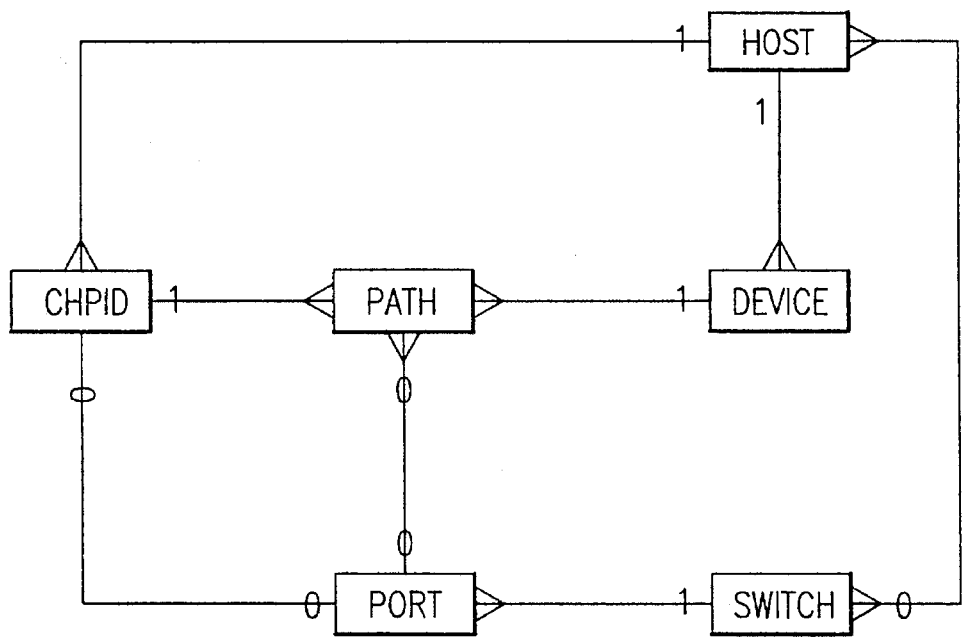
FIG. 10 depicts a data structure useful in implementing the dynamic I/O connectivity database generator feature of the invention. The data structure is shown in an Entity Attribute Relationship data model.

The dynamic I/O connectivity database generator can be implemented by a program and a data structure. The program retrieves the I/O data, determines the interrelationships within the data, then stores the data in the data structure. According to the preferred embodiment of the invention, the data structure to implement the dynamic I/O connectivity database generator is stored in virtual control blocks which can, for example, be related per the Entity Attribute Relationship data model depicted in FIG. 10, with the relationships between the entities described as follows:

FIG. 10 shows a channel path ID (CHPID) is on a HOST; shows a CHPID is used by a PATH; and shows a CHPID is attached to a PORT.

FIG. 10 depicts a DEVICE is accessed by a HOST and a DEVICE is accessible by a PATH.

FIG. 10 also shows a HOST has a CHPID; a HOST has access to a DEVICE and a HOST knows of a SWITCH.

With respect to a PATH, FIG. 10 shows a PATH uses a CHPID; a PATH is used to access a DEVICE and PATH goes through a PORT.

A PORT is shown in FIG. 10 to have an attached CHPID; further, a PORT is shown as used by a PATH and on a SWITCH.

Finally, FIG. 10 shows the SWITCH is known by a HOST and the SWITCH has a PORT.

The data structure reflected by the FIG. 10 model provides the information needed for the Manager to dynamically manage I/O connectivity.

In accordance with the preferred embodiment of the invention, the dynamic I/O connectivity database generator (or program implementation thereof), determines the following information and performs the following steps:

1. First, CHPID information is gathered. In particular, the CHPID number; the Physical Identifier of CHPID; the Physical Identifier of the attached unit (Switching Unit or Control Unit); the Physical Identifier of the interface of the attached unit; the Physical Identifier of the Switching Control Unit Interface (referred to hereinafter as the Switching Control Unit Interface Address); and the Logical Identifier of the Switching Unit.

2. Next, the generator determines the number of Logical Switching Units by going through all the CHPID information and counting the different logical switching unit identifiers.

3. Next, the generator gets Subchannel Information, in particular Subchannel Number; Device Number; and Path Installed Mask for the Subchannel. For each Channel Path (up to 8 in the context of the IBM 370/XA architecture) that is defined to be used to access the device the generator determines the Channel Path Identifier and the Switching Unit Interface where the Control Unit interface is attached. This is the Control Unit to which the device is attached, and which will be accessed by the Channel Path. This will be referred to hereinafter as the Control Unit Interface Address.

4. The generator then determines the Device Number of the Logical Switching Units. For each Logical Switching Unit, the generator gets a CHPID that uses that Logical Switching Unit; from the CHPID information the generator gets the Switching Control Unit Interface Address. For each Subchannel that is accessible from that CHPID until the Switching Device number is found or there are no more subchannels (a) the generator gets the Switching Unit Interface where the CU is attached, that is, the Control Unit Interface Address and (b) if the Switching Control Unit Interface Address is the same as the Control Unit Interface Address then the subchannel is the subchannel that is used for Switching Device. Thus, the Switching Device number is found. If there are no more subchannels and the Switching Device Unit number has not been found, then the Switching Unit has not been defined as a device to this system.

5. Next, the generator performs I/O to each Switching Unit to determine the Unique Identifier of the Switching Unit; the number of switchable interfaces; the Unique Identifier of the "neighbor" unit that is attached to each switchable interface; and the status of each switchable interface, i.e., any special hardware conditions, any special connection states (e.g., blocked, partitioned and dedicated switch states) and the other interfaces it is enabled to communicate with.

6. Next, the generator validates the CHPID to Switching Unit definition. This is done by (a) getting the Unique Identifier of each switching unit, determine the total number of Unique Identifiers that are different (this is the true number of "unique" Switching Unit Unique Identifiers); (b) getting the Unique Identifier of the "neighbor" unit of each CHPID that is attached to a switching unit; (c) determining the Unique Identifier of the first logical switch number that is found; (d) relating all CHPIDs that have the same Unique Identifier (without the interface identifier portion) to the same logical switch number; (e) if there are any CHPIDs that were found to be attached to a switching unit with a Unique Identifier that is not the same as other CHPIDs on the same switching unit, change the relationship of the CHPID to show it is attached to the logical switch number that the other CHPIDs are attached to; and (f) if there are fewer "unique" Switching Unit Unique Identifiers than there are logical switch numbers, then logical switch numbers must be removed; if there are more "unique" Switching Unit Unique Identifiers than there are logical switch numbers, then logical switch numbers must be added.

7. Finally, each instance of the generator (one generator per host) "registers" itself on each Switching Unit that it finds by storing a unique identifier in storage means associated with the Switching Unit. This information is available, through a "read" command to the switching unit. Thus, every instance of the generator can determine which instances of the generator know of each switching unit.

According to a preferred embodiment of the invention each instance of the generator can delete its unique identifier whenever the generator determines it will no longer share a given switch.

What has been described hereinabove is an example of a dynamic I/O connectivity database generator suitable for use as part of the novel Manager. The data structure depicted in FIG. 10 is used by the Manager to satisfy user requests, i.e., to determine I/O components affected by a given command (e.g., block, etc.).

The data structure is created dynamically, i.e., without predefined definition, relying on data available through the CSS and via the direct switch access. Thus, another principal objective of the invention has been met.

The remaining two features of the invention, System Integrated Switching and the Floating Master Interlock, will now be described in detail.

System Integrated Switching solves the problem of I/O switching that inadvertently causes programming and/or systems to fail due to loss of physical connectivity to a required I/O resource. System Integrated Switching allows the Manager to perform its function "safely".

It should be recalled that System Integrated Switching is defined herein as a method by which logical availability changes are made in order to reflect physical connectivity changes.

A method will now be described, that in one embodiment can be implemented by a computer program, to control physical Input/Output Switching Units in such a way as to keep their logical availability status synchronized with their physical connectivity status. The major benefit of this function is to protect computer systems, programs, and users from adverse physical changes.

System Integrated Switching embodies the following concepts and utilizes the following functions and services, generally applicable and available in larger (i.e., mid sized and mainframe) computer operating systems:

(1) A computer hardware Input/Output (I/O) configuration which contains channels, devices and switching units. Any physical device that lies in the physical path between a channel and a device that has switchable interfaces, or Ports, is referred to herein as a Switching Unit. Switching Units may be separate devices dedicated to providing switchable access from multiple channels to multiple control unit interfaces or they may simply be Control Units with switchable interfaces.

(2) A concept of paths that are sets of channel device relationships. As is well known to those skilled in the art, a single computer operating system, subsystem or program can be provided with one or more paths to a device. Any device is available for I/O operations as long as at least one path is still available.

(3) A concept of logical availability and physical connectivity. A path is logically available as long as the operating system, the subsystem that controls I/O, or other program indicate that when performing I/O requests to a device, the specific path to the device may be used for that I/O. A path is physically connected as long as there are means to perform the I/O operation. There may be several units in the physical path. All of them must have power, be physically connected (i.e. cabled) and, if switchable, enabled (i.e., physically switched to allow connectivity) in order for the I/O to complete.

(4) Mechanisms for a program to determine the current logical status of the path.

(5) Mechanisms for a program to determine, from the Switching Unit, the current physical status of the paths.

(6) Mechanisms to control the logical availability of the path, and return the status of the request (that is, whether or not it was immediately successful). As indicated hereinbefore this function is a VARY command in some systems and will be used as the name of this function hereinafter. After a VARY offline is successful, the path is not available for selection by the system to complete I/O requests to the device. After a VARY online is successful, the path is available for selection. A VARY offline command is unsuccessful when the system determines that it requires that path for access to the device.

(7) Mechanisms for a program to control a Switchable Unit in order to alter the physical connectivity status of the attached resources. These mechanisms are invoked by the program in response to a command or instruction that is initiated from outside of that program, e.g., an operator wants to alter the physical connectivity to let a certain channel access a device, i.e., implement a "CONNECT" command.

(8) Mechanisms for multiple instances of a program to communicate with each other. Those instances of the program may execute on separate physical computer images. Such a mechanism has been previously discussed, i.e., the Inter-System Communication facility allows instances of the Manager which employ the System Integrated Switching capability to communicate with each other.

A preferred embodiment of the invention incorporates a mechanism that eliminates the possibility of interference if Vary path commands are issued from two or more sources such as the Manager, an operator or others. An example of interfering commands is when an operator specifies that a path is to be Varyed offline and the Manager follows with a Vary online command. To eliminate the possibility of interference when conflicting Vary commands are issued, separate Vary path status bits for each possible source of the Vary path command are logically combined. Unless all possible sources of the Vary path command are in the Vary On state, the path is offline.

System Integrated Switching is implemented through the use of a data structure and a program.

The data structure describes the relationship of entities in the Input/Output configuration. The I/O configuration may contain:

1. Systems where the program is running (Host systems),

2. Channels as identified by Channel Path Identifiers (CHPIDs);

3. Devices;

4. Paths (that is, the channel to device route);

5. Switching Units; and

6. Ports (that is, the attachable interfaces) on the Switching Units.

Dynamic connectivity database generation has been described previously herein and can be used to create a data structure which allows a program to be written so that, for a given port on a switch, the program can determine the paths of the I/O configuration that make use of that port.

The data structure, previously described with reference to the Entity Attribute Relationship data model shown in FIG. 10, is populated with the data contained in the I/O configuration description that is used by the operating system, any subsystems that control I/O, and the hardware. Each instance of the program runs on a separate instance of an operating system, (e.g., as part of each Manager) so that the data structure contains the host operating system's view of the I/O configuration.

It should be noted that System Integrated Switching can be performed independently of the automatic dynamic I/O connectivity database generator teachings set forth herein. For example, manually entered data could provide the necessary data structure to perform System Integrated Switching. However, the preferred embodiment of the invention (insofar as the Manager is concerned) combines the dynamic I/O connectivity database generator with System Integrated Switching.

The System Integrated Switching method defined herein can be implemented in computer program form by those skilled in the art. The method is depicted in the flowcharts shown in FIGS. 11–15. The program can be executed (i.e., run) on one or more computers, with one instance of the program on each computer. The program can accept commands (via user inputs at the host level) that control the Switching Units that the program can access. The access is performed via I/O operations to the Switching Unit.

A unique feature of System Integrated Switching is that it will coordinate changes made at the Switching Unit, which cause changes in physical availability, with changes to the logical availability of the logical paths that use the changed physical path.

The invention implements the conditions that must be satisfied for the physical switching operation to be completed. The important conditions are:

1. Whenever an available path will become unavailable, the switching operation is not physically implemented unless all instances of the program have successfully performed the logical equivalent of the switching operation.

2. Only changes that remove connectivity require approval by all instances of the program. While the attempted addition of available paths may not succeed, adding connectivity is not considered to be detrimental to a system's integrity.

3. It is assumed that the default response from any instance of the program is "No, do not switch", i.e., the program could not determine that the switching operation has no detrimental affects. Therefore, any instance of the program that does not respond to the request to coordinate the logical and physical operations within a certain amount of time can be considered to have an objection to the switching operation.

4. A "Backout" process, as previously defined herein, is provided which removes the logical effects of the switching operation if all systems can not successfully accommodate the loss of paths that the physical switching operation would cause. Thus, the systems are returned to the state they had before the attempted switching command, so it appears to all systems as if the switching operation had never been attempted.

5. A "Switch Backout" process, as previously described herein, is provided which returns all Switching Units and all hosts to the state they were in before the switching command. That is, the physical effects and the logical effects of the switching operation are removed.

While not described in the flow diagrams to be set forth hereinafter, the program may control more than one Switching Unit during a single switching command. All switches must successfully complete the physical change, or else switch backout is performed.

6. Also, while not described in the flow diagrams, the program may provide the user options for flexibility in controlling the physical I/O configuration with program commands:

(a) A "No Vary" option, which directs the program to not issue the system commands (e.g. VARY) that coordinate the logical availability of the systems. This option bypasses all the functions of System Integrated Switching, so that the program acts as a "normal" switching system.

(b) A "Force" option, which directs the program to override the negative response, i.e., "No Vote", of one or more instances to the program. The force option also directs the program to bypass "switch backout" as explained hereinbefore. This function is useful when the switching command was issued to fix the reason there was a negative response.

(c) A "No Backout" option, which directs the program to not distribute the "Backout" after a negative response to removing connectivity. This option, again discussed hereinbefore in the context of the Manager overview, can keep systems from using the paths that were successfully made unavailable, so that a later iteration of the switching command will not encounter new paths in use that were able to be removed in an earlier iteration.

Figure 11:
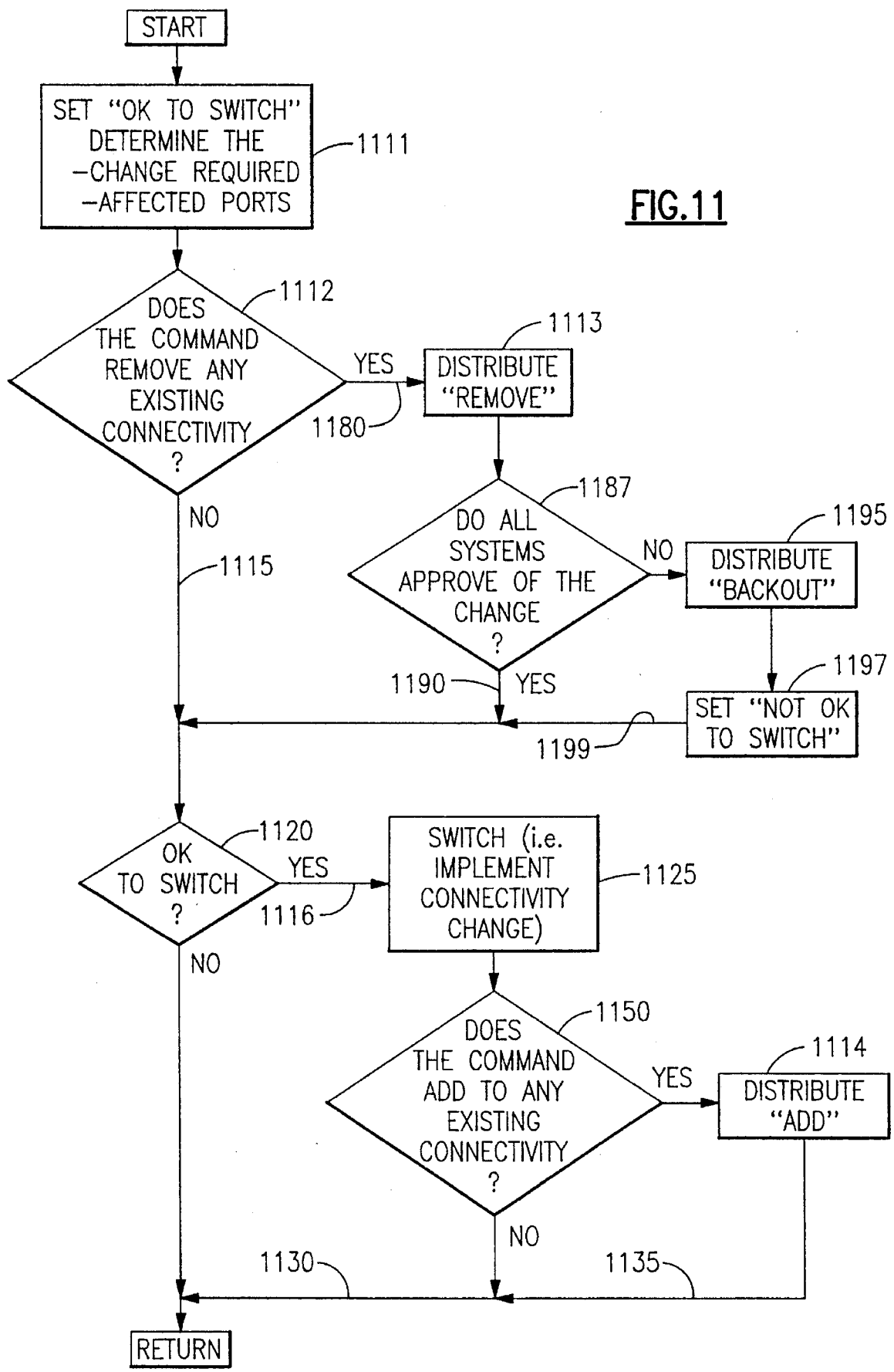
FIG. 11 is a flowchart that depicts the functions performed by System Integrated Switching.

FIG. 11 is a flowchart that depicts the overall functions performed by System Integrated Switching. Assuming a computer program implementation, FIG. 11 can be thought of as showing the flow of the main program routine where the physical connectivity change will be made only if all of the instances of the program have successfully changed the corresponding logical availability. That is, all instances of the program have determined that their host systems are not adversely affected by the physical change. This is shown in block 1111 of FIG. 11 as "OK to switch". This method will change the status of logical paths so that they are synchronized with the physical path changes made by a switching command.

In order to implement the switching command that was issued by the operator or other program, the program 1 must determine (1) the ports that must be changed (also shown at block 1111 of FIG. 11), and (2) the connectivity change to be made to those ports (block 1112).

This is not unique, all switching programs must do this. All connectivity change commands are always reducible to: (1) disabling the existing physical connectivity between two or more ports (including disabling all physical connectivity from a port) which causes a "Remove" to be distributed (block 1113); enabling physical connectivity between two or more ports, which causes an "Add" to be distributed (block 1114); or a combination of both disabling and enabling, in which case there are both a "Remove" and "Add" distributed.

Stepping through the flowchart shown in FIG. 11, if the command does not remove any existing connectivity, path 1115 is taken following block 1112. Since "OK to switch" was previously set at block 1111, path 1116 is taken after block 1120. The connectivity change is implemented at block 1125 (the database is updated). If no additional connectivity is added (as determined at block 1150) the program returns via path 1130. If connectivity is added, an "Add" is "distributed" at block 1114, in the fashion to be explained hereinafter with reference to FIG. 12, after which the program returns via paths 1135 and 1130.

If connectivity is to be removed (going back to block 1112), path 1180 is taken and the "Remove" is distributed (in the manner taught with reference to FIG. 12) at block 1113. At block 1187, if all systems approve the change (e.g., if each instance of the Manager approves the change), then path 1190 is taken to block 1120, followed by block 1125, etc. as above (since "OK to switch" remains set). However, if it is not the case that all systems approve the change, then, "Backout" is distributed at block 1195, "not OK to switch" is set at block 1197, and the program returns via path 1199 and block 1120.

Figure 12:
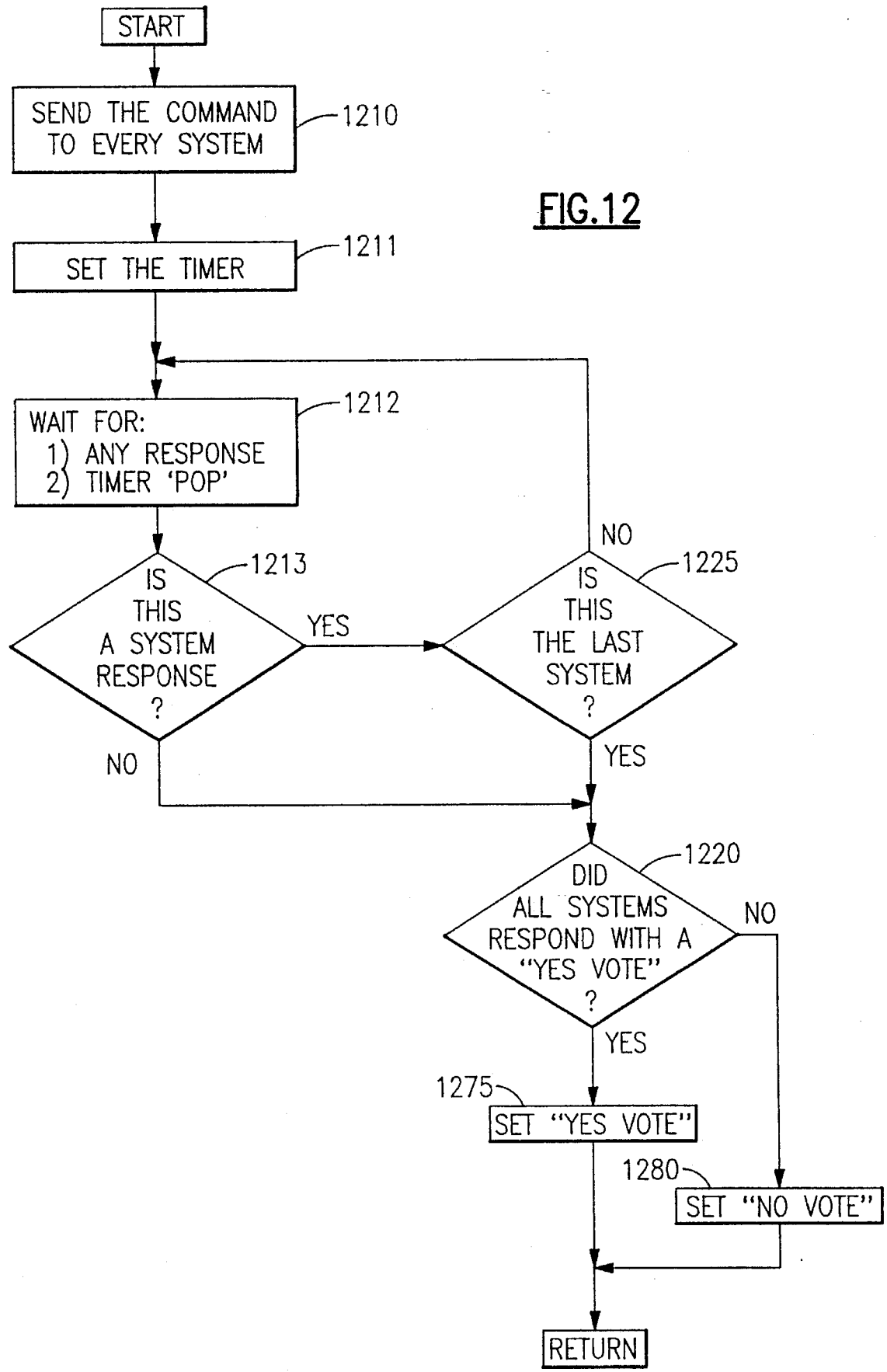
FIG. 12 is a flowchart that depicts the operation of the "distribute" function depicted in FIG. 11.

Having described the overall function of System Integrated Switching in flowchart form, FIG. 12 should be referred to for the details of the "Distribute" function.

FIG. 12 shows a method whereby the program can "Distribute" the specified physical change command, so that the switching operation is kept integrated with the state of all systems where the program is running. In this way, all systems that are potentially affected by the physical change can be tested for adverse effects of the switching operation.

This part of the program essentially tests for a "consensus of opinion" among all the instances of the program. Only when all systems can accommodate the physical switching operation is the command executed at the physical level.

Block 1210 of FIG. 12 shows the command is sent to every system followed by a timer being set (at block 1211).

At block 1212, the program waits for responses and waits for the timer to lapse. If a system response is observed (block 1213), then the response is recorded (a "yes" vote or a "no" vote) for later analysis at block 1220. The program loops back to block 1212 if other systems have yet to report (1225) and if the timer has not lapsed.

After either a timer lapse or recordation of all system responses, the system "votes" are analyzed at block 1220. If all systems returned a "yes vote", i.e., there are no objections to removing connectivity of a resource, then "yes vote" is set and block 1275, with the "Distribute" program returning thereafter. Any no vote (or non-reporting systems) will cause "no vote" to be set at block 1280 with the "Distribute" program returning thereafter.

Figure 13:
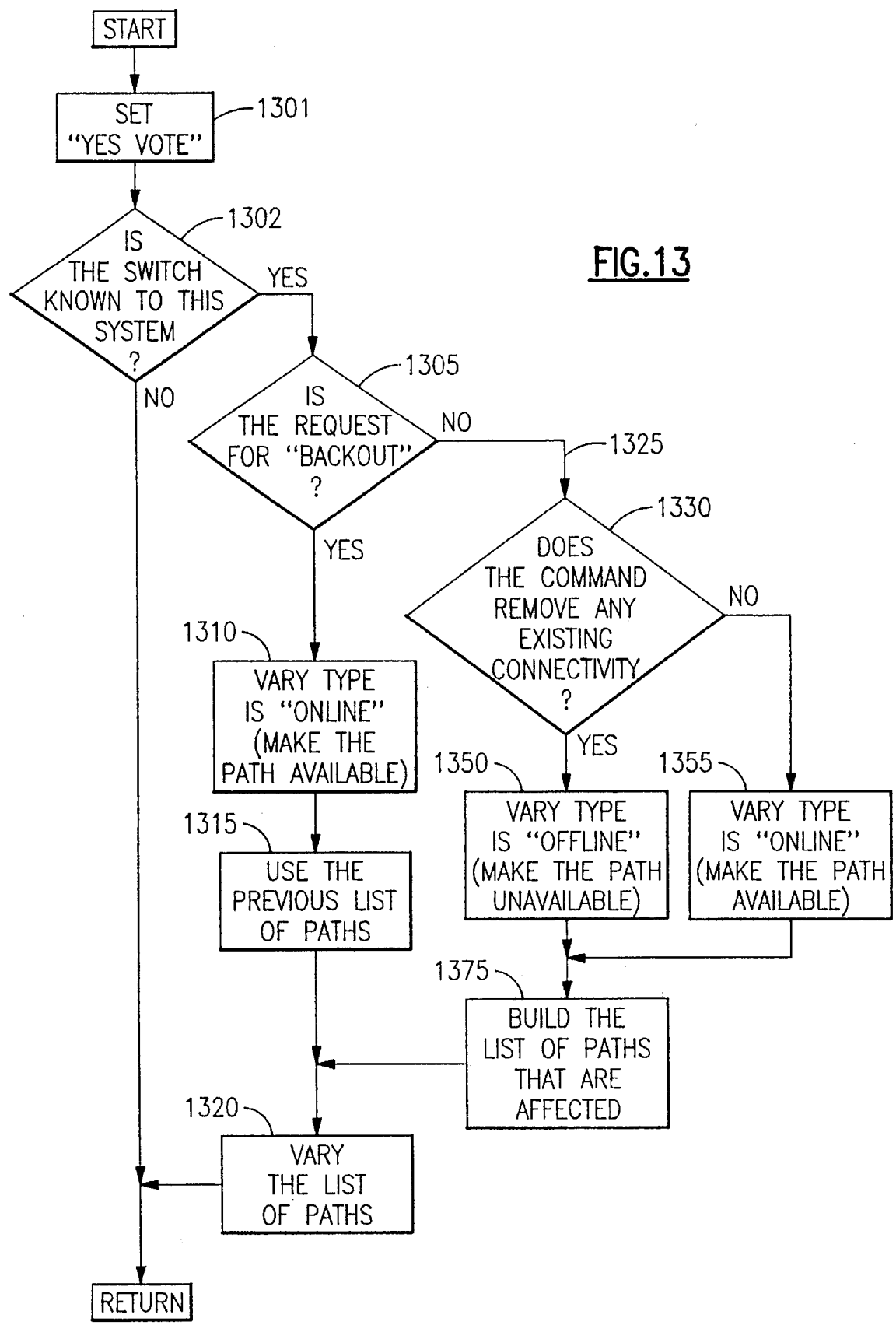
FIGS. 13, 14 and 15 depict a process that each instance of a computer program implementation of System Integrated Switching can go through to determine which paths are affected by a switching operation
Figure 14:
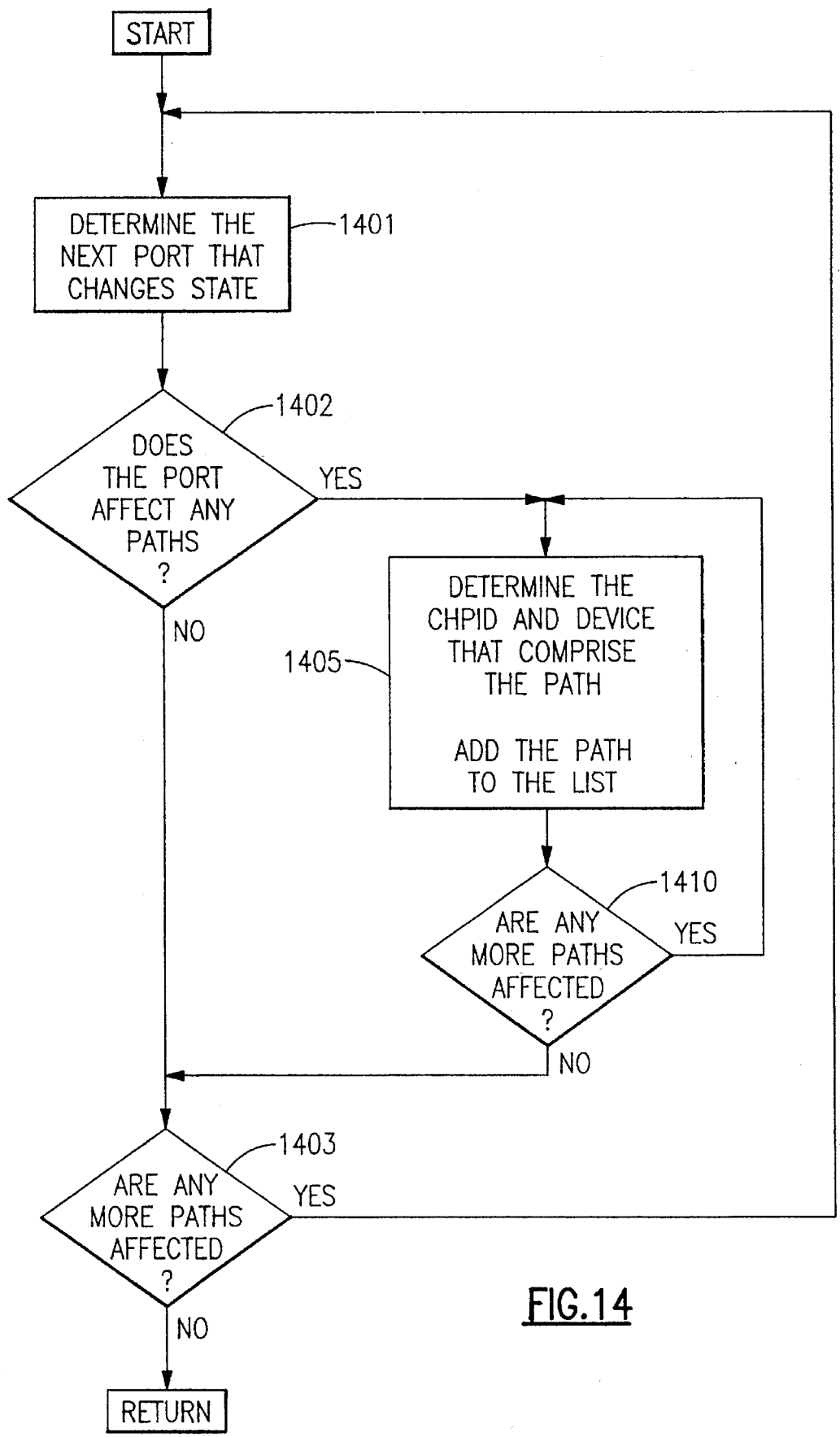

FIGS. 13 and 14 show the process that each instance of a program (structured in accordance with the preferred embodiment of the invention), goes through to determine which paths are affected by the switching operation.

This portion of the program is given a list of one or more ports, and the connectivity change that is intended to be made to them.

The program locates the paths that use the switch port by using information stored in the form of the data model shown in FIG. 10. After finding a path, the program locates the CHPID and the DEVICE that comprise the path and are the operators of the VARY command. If the program does not "know" of the switch or port, the physical switching operation will not affect any known paths.

According to the preferred embodiment of the invention, each system on which System Integrated Switching is being performed follows the flowchart depicted in FIG. 13.

To begin with, "yes vote" is set at block 1301. If the switch in question is not known to the system (determined at block 1302), then the processor returns since, as indicated hereinbefore, the physical switching operation will not affect any known paths.

If the switch is known to the system and if the request is a "Backout" (determined at block 1305) then the VARY type is "online" to make the path available (see block 1310). In this case the previous list of paths is used (block 1315) and these paths are VARYed online at block 1320. The program then returns.

If the request is not a "backout", then path 1325 is taken from block 1305, and a check is performed at block 1330 to determine if the command removes any existing connectivity. If yes, then the VARY type is "offline" to make the path unavailable (block 1350). If no connectivity is being removed, then the VARY type is "online" (block 1355). After the VARY type is set, the list of affected paths are built at block 1375, described with reference to FIG. 14 immediately hereinafter. Finally, the list of paths are VARYed (online or offline depending on the setting at a block 1350 or 1355) and the program returns.

FIG. 14 depicts a flowchart useful to implement the "build the list of paths" function.

At block 1401, the program determines the next port to change state. If at block 1402 it is determined that the port does not affect any paths, the program checks for any other affected ports (at block 1403), and if there are none, returns.

If the port being analyzed affects a path, then the program determines (at block 1405) the CHPID and device that comprise the path and adds the path to the list. Each path added to the list can be VARYed in accordance with the portion of the program described with reference to FIG. 13. The program loops back to block 1405 if it is determined at block 1410 that more paths are affected. Otherwise, the program will return unless more affected ports need to be analyzed (per block 1403).

Figure 15:
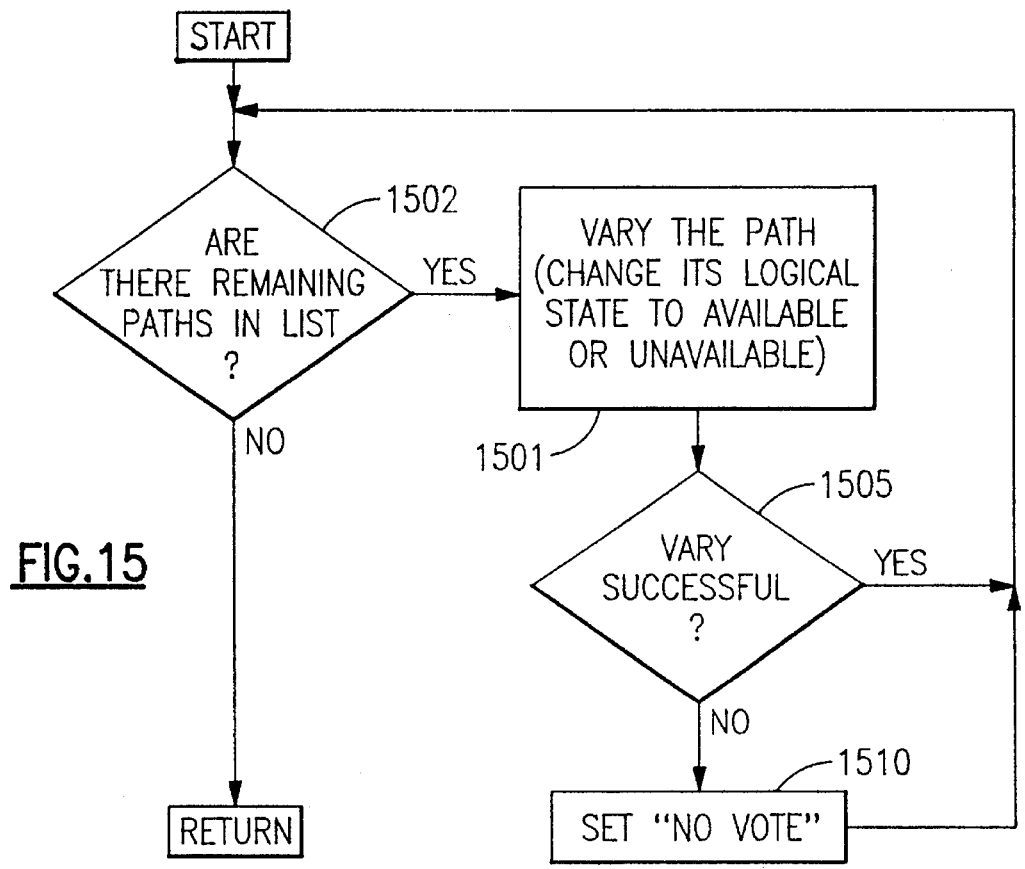

Finally, FIG. 15 shows the process that each instance of the program goes through to coordinate the logical and physical status of the paths in such a way as to determine the effect of the physical switching command. An attempt is made to VARY the specified PATH (at block 1501 if there are any paths on the list as determined at block 1502) to make it either available or unavailable. If any VARY PATH attempt is unsuccessful (block 1505), a "no vote" is registered (at block 1510) so as to show that the system can not accommodate the physical change. It is assumed that the system which processes the VARY command controls the use of that path by programs in the system.

What has been described with reference to FIGS. 10–15, are the details to enable those skilled in the art to implement a System Integrated Switching capability (preferably in computer program form) in order to perform "safe" switching utilizing the novel Manager. An I/O connectivity manager that incorporates the System Integrated Switching function (which is incorporated in the preferred embodiment of the Manager described herein), will result in a computer system in which physical switching operations are integrated (coordinated) with the system's logical view of I/O connectivity. Accordingly, another principle objective of the invention has been met.

The remaining principal object of the invention is to be able to perform dynamic I/O connectivity management in a multiuser environment in a manner which assures that a command or set of commands are performed to completion by one user (such as an instance of the novel I/O manager) before another user can issue a command or set of commands, and to assume the overhead and responsibility for this function at the host level. This objective can be met via the Floating Master Interlock function, described immediately hereinafter with reference to FIGS. 16–19.

A "Floating Master" is defined herein to be a method that can be used by a computer program that has multiple instance (or images) (e.g., Manager), to interlock the instances so that a single instance can maintain initiative as long as it needs to or wants to, after which any other instance may take and maintain initiative.

All program instances that use this method begin as peers. That state remains until a user enters a command on one instance. Then, that instance becomes the master and all other instances are slaves and must do what the master instance directs them to do. When the user has completed his task the master reverts to its peer status, after which any program instance can become the new master.

This portion of the invention is particularly useful for any program with multiple instances that has several users who are entering both multi-part commands and multi-command processes, where each instance must be free of interference (in the form of other program instances affecting the state of the system) for the duration of one command or one process.

The Floating Master Interlock provides an interlock mechanism where the user who starts a multi-part process on a multi-user distributed application, is assured that the state of the system that is under control of the application is displayed and/or changed only under the control of the single user. Also provided are methods of recovery inherent in the interlock mechanism so that (a) there are no deadlock situations which prohibit all user access; (b) any point of failure in the multi-system environment does not prohibit further user access; and (c) any point of failure in the multi-system environment does not allow multiple users access at the same time.

The "lock" concept used by the invention, implies that an area of program storage is either blank, meaning no lock is in place, or contains a value which describes the lock state and the owner of the lock.

Each program image must keep this lock storage, and adhere to a protocol which modifies or verifies the lock state at certain times during the processing of the program.

In order to implement the Floating Master Interlock, the following data items must be saved:

(a) "current user" which is a unique identifier of the user (e.g., user ID and system ID) that is currently processing.

(b) "previous user" which is a unique identifier of the user that was processing last.

(c) "timestamp" which is the time of the last application interaction on behalf of the current user.

The following command structure can be used (and is used) in the preferred embodiment of the invention incorporating Floating Master Interlock, to change the lock state:

(a) "LOCK", which is used to start a process of one or more commands. This command begins a "Process-lock".

(b) "UNLOCK", which is used to signal the completion of a process of one or more commands. This command terminates a "Process-lock".

(c) "START", which is used to start a single command. This command begins a "Command-lock".

(d) "END", which is used to signal the end of a single command. This command terminates a "Command-lock".

(e) "GETLOCK", which is used to take the lock from another user. This command terminates any Process-lock and in certain instances any Command-lock, that is held and begins a Process-lock by a new owner.

(f) "SET TIMEOUT", which is used to establish the amount of time needed to elapse before a Command-lock lock can be taken using GETLOCK.

Figure 16:
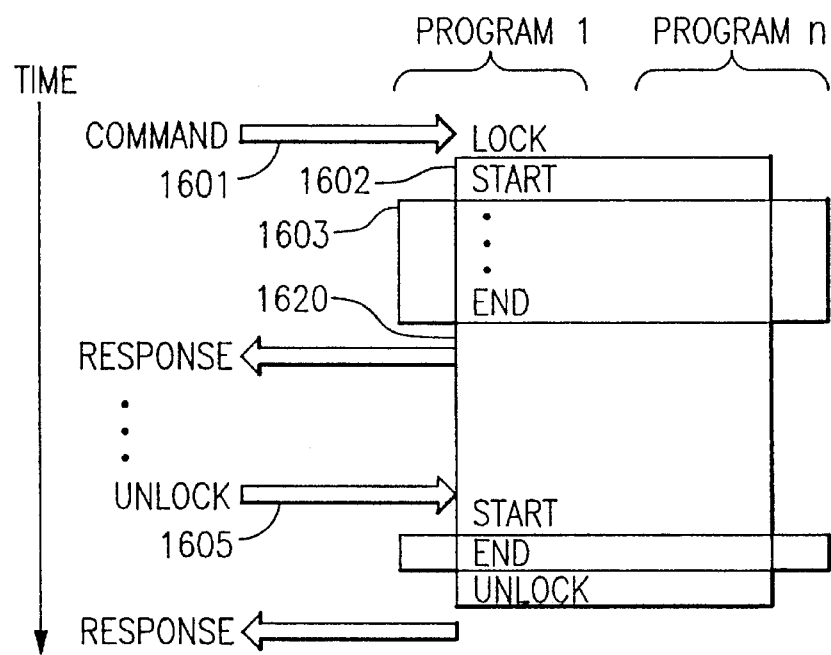
FIGS. 16–19 illustrate the Floating Master Interlock feature of the invention.

Floating Master Interlock functions can best be understood with reference to FIGS. 16–19. FIG. 16 depicts both Process-level and Command-level locks. The legend on FIG. 16 indicates the various symbols used in FIG. 16 (and FIGS. 17–19 as well) to illustrate entry of a user command, a program response, and the time domains over which Process-level and Command-level locks are set.

In each of FIGS. 16–19, Program 1 and Program 2 correspond respectively to a first and second user of the facility that incorporates the novel interlock capability (e.g., Manager).

FIG. 16 illustrates a user having entered (at 1601) a command to a program which has implemented the Floating Master lock protocol.

The user's first command to the program will cause a Process-level lock (at 1602) and a Command-level lock (at 1603) to be made. If the Process-lock is not successfully obtained on all program instances, then the program must UNLOCK on every program instance where the lock was obtained. Thus, two or more users attempting to lock at the same time will both backout their own lock attempts.

During the time that the Command-level lock is held, the program can perform its normal functions with the assurance that all other instances of the program will not allow additional users to invoke the program.

When the command completes, the Command-level lock is terminated, but the Process-level lock remains (see point 1620 in FIG. 16) until the user explicitly enters an UNLOCK command to the program (shown at 1605). During the time that the Process-level lock is held, the user is assured that all other users are rejected from invoking the program and are told that the first user is processing.

FIGS. 16–19 also indicate that a system response follows the completion of each command entered.

Figure 17:
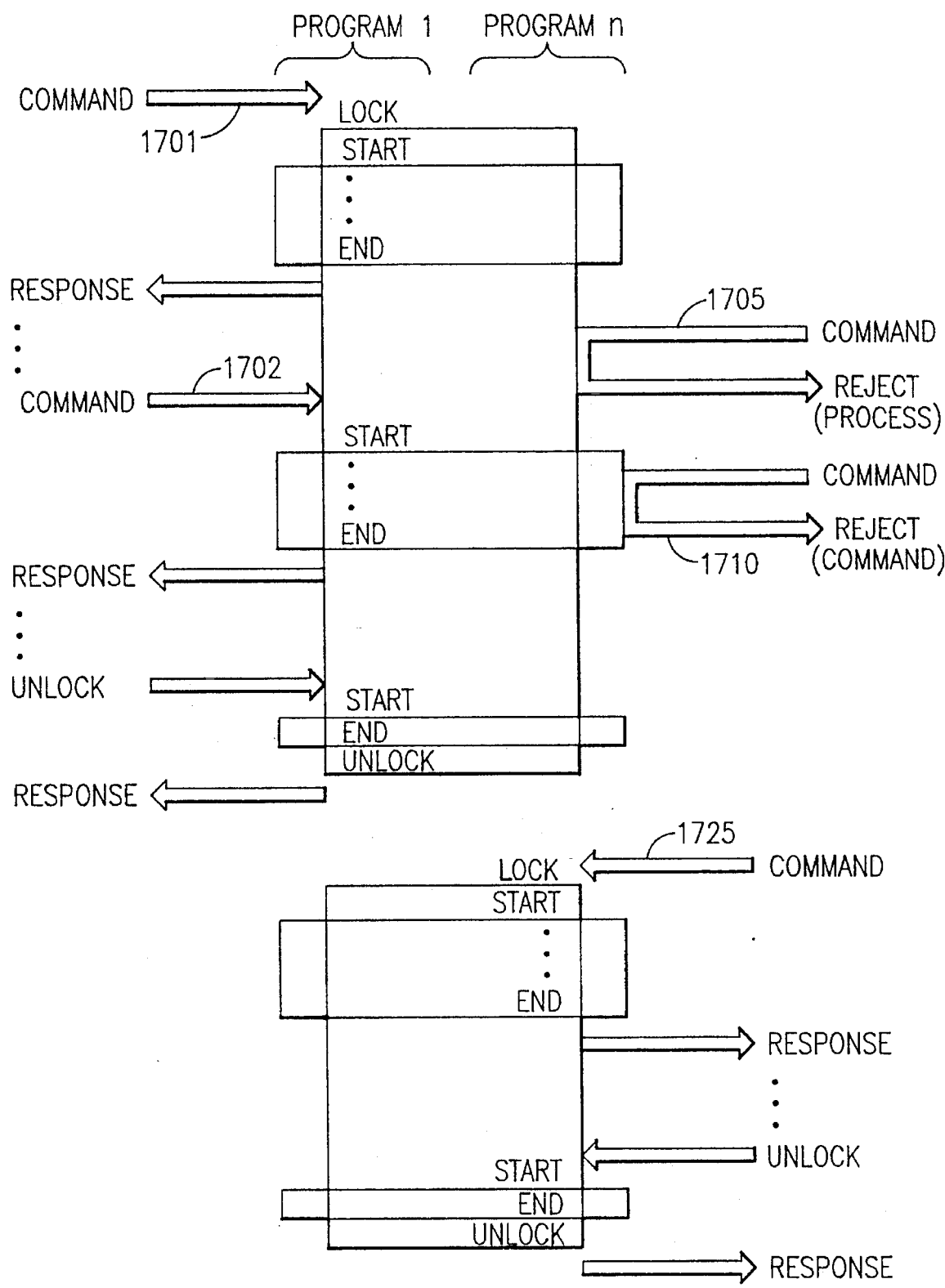

FIG. 17 depicts the interlock facility being used in an environment where multiple commands and multiple users are present. The first user has entered two commands (at 1701 and 1702). The second user has attempted to enter a command first during a Process-lock (at 1705), which is rejected with an indication that a Process-lock is in effect, and who the lock owner is. Then during a Command-lock, the command is rejected (at 1710) with an indication that a Command-lock is in effect, and who the lock owner is. Finally, when there were no locks held (at 1725), the second user's command is accepted, and the second user becomes the new master.

Since the current user is both the system ID and the user ID combined, the second user would get the same response if it were to enter the command on the same system as where program 1 is running.

Figure 18:
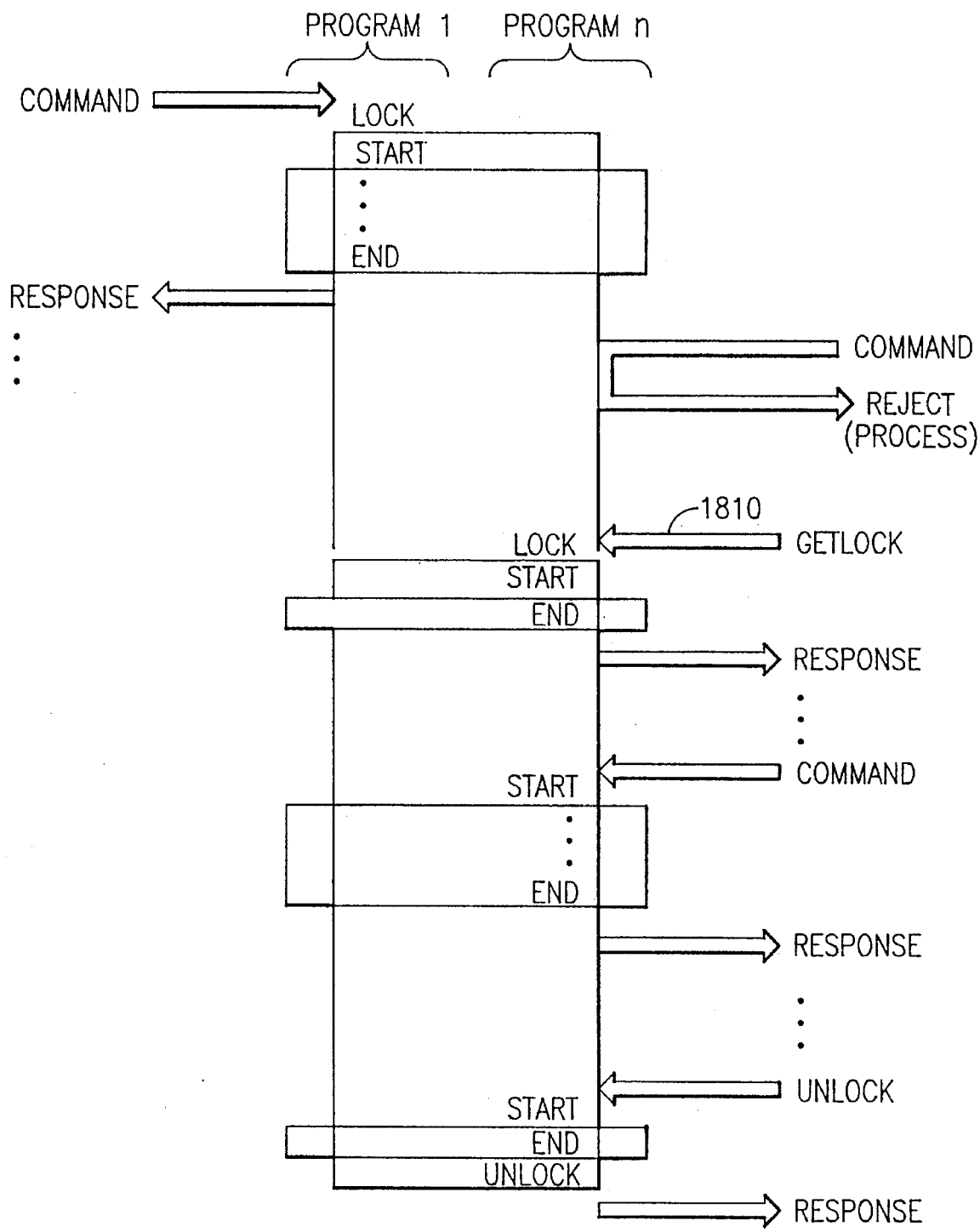

FIG. 18 depicts the operation of the preferred embodiment of the Floating Master Interlock when the second user inputs a GETLOCK while a Process-lock is held by Program 1. FIG. 18 shows how a second user can take over the lock from a current user at any time when only a Process-lock is held (e.g., at point 1810 in FIG. 18).

Figure 19:
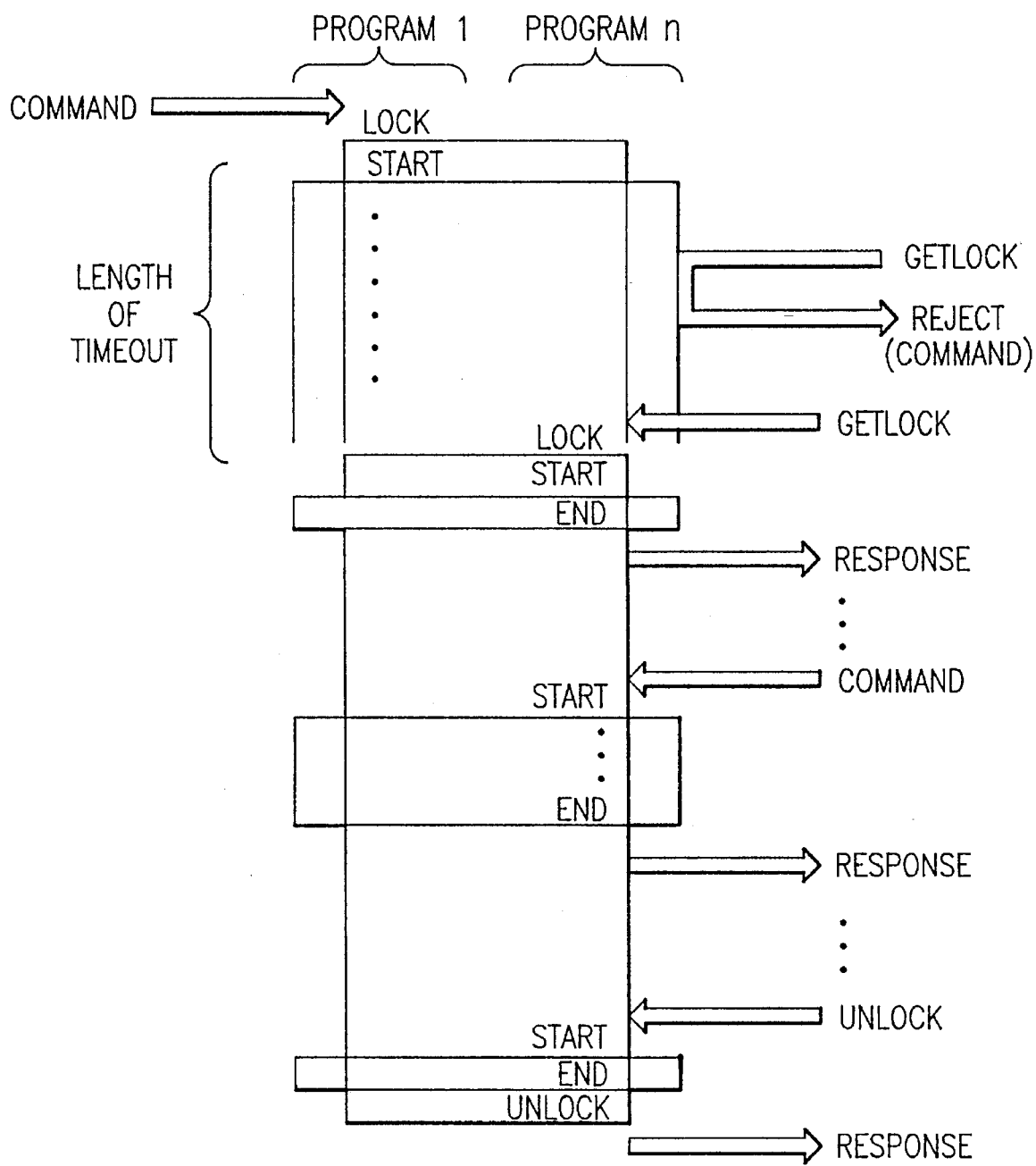

Finally, FIG. 19 depicts the preferred operation of the Floating Master when a GETLOCK command is issued (by user 2) when a Command-lock is held (by user 1).

FIG. 19 depicts a "hostile takeover" by user 2. That is, when a Command-lock is held, but because of a system failure or other extreme condition, the current user must be changed.

The GETLOCK is the only command that, in accordance with the preferred embodiment of the invention, is not rejected immediately when a Command-lock is held. The program will not successfully perform a GETLOCK until the predefined amount of time has passed since the last completed program action. This amount of time can be changed using the SET TIMEOUT command.

According to a preferred embodiment of the invention, in addition to saving current user, previous user and timestamp information, the Manager also saves the user and system ID of any user that had its Process-lock terminated via a GETLOCK command. Such user is referred to hereinafter as a "bumped" user.

The additional data saved by the Manager is maintained at all instances of the Manager (for example, via a linked list) and is also provided to each instance of the Manager that comes online. When a bumped user subsequently enters any commands to the Manager, the command is rejected with an indication that the Process-lock previously held by that user was terminated. This assures that a first user will be informed if another user performed a GETLOCK and UNLOCK between two commands issued by the first user, even in the event of a system failure and restart.

Furthermore, according to a preferred embodiment of the invention, in addition to saving the above described data, the Manager also saves the key counter values associated with switches in the Manager's domain every time data is read from the switch to create the database. By saving this information the Manager can inform each user as to whether or not the key counter has been changed since the user's previous command.

Floating Master will attempt to LOCK on all other instances of the program for a "hostile takeover" attempt. Each instance of the program will store the previous user when a "hostile takeover" condition is detected. The program that is attempting the takeover must lock on all instances of the program, except the previous lock owner's instance, or else it must remove its GETLOCK attempt, which will cause all instances of the program to reinstate the previous user to the current user state. This action will keep two programs from fighting for new ownership, and keep both of them from "succeeding", as well as allow for a "STOP" condition to exist (i.e., a temporary condition where the program allows the timeout to elapse without intervening actions, so that it appears to have failed, when it really is still processing) on the first current users system, so that the first user can pick up processing where it left off without a failure.

The Floating Master Interlock described hereinabove would assure data integrity in a multi-host environment where I/O connectivity is managed from the host level. If the Manager were running on only a single host processor (under a single operating system with a single user) clearly, the Floating Master Interlock would not be required. However, for the more general case of the Manager, i.e., where there are multiple users and where interhost communications take place with the same data being processed by all instances of the Manager, then Floating Master Interlock becomes essential to assure data integrity.

The foregoing description provides the details for dynamic I/O connectivity manager, which operates at the host level of a computer system. The various preferred features of the novel connectivity manager, in particular System Integrated Switching, the Floating Master Interlock, the Dynamic I/O connectivity database generator, and the means for providing direct access to switch controller, when all combined, provide the means to meet all of the aforestated objectives.

Those skilled in the art will readily appreciate that the novel connectivity manager described herein does not require all of the aforestated features to perform its stated function (e.g., where only a single user with a single host instance of the connectivity manager is present, no Floating Master facility is needed).

Furthermore, those skilled in the art will also readily appreciate that each of the above described features are in and of themselves novel in their application to managing I/O connectivity and novel for use in other applications (e.g., Dynamic I/O connectivity database generation and the interlock capabilities described, clearly can have application outside the context of I/O connectivity management). Accordingly, these novel features are not intended to be limited for use as part of a connectivity manager per se.

Finally, those skilled in the art will recognize that the foregoing description of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the invention and its practical application to thereby enable others skilled in the art to best utilize the invention in various embodiments and with various modifications as are suited to the particular use contemplated.

While the invention has been particularly shown and described with reference to preferred embodiments, it will be understood by those skilled in the art that various changes in form and details may be made therein without departing from the spirit and scope of the invention.

What is claimed is:

1. In a computer system that supports distributed application processing, where an application is embodied in multiple instances of a computer program which has a plurality of users capable of entering either single or multi-command processes, a method by which each instance of such program is assured that once it has been named owner of a lock all other instances of the program will be prevented from entering processes for the duration of that instances ownership of the lock, said method comprising the steps of:

a) initially having all of the multiple instances act as members of a peer group allowing any instance of the group to accept a command from a user;

b) thereafter entering a LOCK command for a multi-command process from one user through one of the any instances of the group;

c) activating in the name of said one instance a process-level lock which remains active for the process and a command-level lock which is active during performance of commands in said process, which locks prevent entry of processes by other users through other instances of the group;

d) allowing the entry of a GET LOCK command through another instance to transfer to the name of the other instance any lock only after the passage of a preset period of time when said command-level lock is active during the process; and e) allowing the entry of said GET LOCK command to transfer to the name of the other instance any lock without waiting for the preset time to pass when said process-level lock is active and a command-level lock is not active.

2. The method set forth in claim 1 further comprising the steps of:

f) automatically deactivating a command-level lock when the command covering said lock to be set is complete; and g) allowing said one user who set the process-level lock to control termination of said process-level lock in the absence of the allowing entry of any GETLOCK command in step d) or e).

3. The method as set forth in claim 2 including the step of:

h) rejecting a first command of said one instance when a lock in its name was terminated by step d) or e).

4. The method as set forth in claim 3 including the step of:

i) maintaining program lock information identifying to all instances of said program, the instance of the program that owns the locks and the lock state of both locks.

5. The method set forth in claim 4 including the step of:

k) deactivating all said locks unless such locks are obtained over all instances of said program.

6. In a computer system that supports distributed application processing, where an application is embodied in multiple instances of a computer program where said computer program has a plurality of users capable of entering either single or multi-command processes, a method by which each instance of such program is assured that once it has been named owner of a lock other instances of the program will be prevented from entering processes from other users for the duration of that instances ownership of the lock, said method comprising the steps of:

a) initially having all of the multiple instances act as members of a peer group allowing any instance of the group to accept a command from a user;

b) thereafter entering a LOCK command of a multi-command process from one user through one of the any instances of the group;

c) activating, in the name of said one instance, a lock which prevents entry of processes by other instances;

d) allowing the entry by other users of a GETLOCK command through another instance of the program;

e) transferring said lock to the name of such another instance on the occurrence of a step d);

f) maintaining the name of said one instance upon transfer of the lock to said another instance for informing said one instance that the lock was transferred to the one another instance;

g) allowing any other instance of said program to enter a LOCK command from another user upon completion of said process without the occurrence of a step d) during the process; and h) activating a lock as set forth in step c) in the name of such any other instance of the program.

7. The method set forth in claim 6 further comprising the steps of:

i) having the instance who set the lock explicitly terminate the lock before step d) is performed.

8. The method as set forth in claim 6 including the step of rejection a first command from the instance of the program whose lock was terminated by step d).

9. The method set forth in claim 8 deactivating any of said locks unless both said locks are obtained over all instances of said program.

10. The method as set forth in claim 5 including the step of reinstating said one instance as owner of any said locks on deactivating said locks in step k).

* * * * *

UNITED STATES PATENT AND TRADEMARK OFFICE
CERTIFICATE OF CORRECTION

PATENT NO. : 5,553,287

DATED : September 3, 1996

INVENTOR(S) : Bailey et al.

It is certified that error appears in the above-indentified patent and that said Letters Patent is hereby corrected as shown below:

In column 1 of the front page of the patent at lines 4 through 7, the Inventors reading "Christopher J. Bailey, Bearsville; Lynn M. Dirks, Boiceville; William R. Firm, Kingston; Lawraine J. Vallee, Saugerties, all of N.Y." should read: --Christopher J. Bailey, Bearsville; Lynn M. Dirks, Boiceville; William R. Firm, Kingston; Gary A. Fisher Sr., Port Ewen; Peter I. Kania, Poughkeepsie; Lawraine J. Vallee, Saugerties, all of N.Y.--

Signed and Sealed this

Fifteenth Day of April, 1997

Attest:

BRUCE LEHMAN

Attesting Officer

Commissioner of Patents and Trademarks